(12) United States Patent
Yang et al.

(10) Patent No.: US 12,095,167 B2
(45) Date of Patent: Sep. 17, 2024

(54) ANTENNA PANEL CONTROL METHOD, TERMINAL DEVICE, AND NETWORK SIDE DEVICE

(71) Applicant: VIVO MOBILE COMMUNICATION CO., LTD., Guangdong (CN)

(72) Inventors: Ang Yang, Dongguan (CN); Peng Sun, Dongguan (CN); Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 339 days.

(21) Appl. No.: 17/366,814

(22) Filed: Jul. 2, 2021

(65) Prior Publication Data

US 2021/0336333 A1    Oct. 28, 2021

Related U.S. Application Data

(63) Continuation of application No. PCT/CN2020/070069, filed on Jan. 2, 2020.

(30) Foreign Application Priority Data

Jan. 8, 2019  (CN) .......................... 201910017401.0

(51) Int. Cl.
*H01Q 3/24* (2006.01)
*H04B 7/04* (2017.01)

(52) U.S. Cl.
CPC ................ *H01Q 3/24* (2013.01); *H04B 7/04* (2013.01)

(58) Field of Classification Search
None
See application file for complete search history.

(56) References Cited

U.S. PATENT DOCUMENTS

| | | | |
|---|---|---|---|
| 10,141,999 B2 | 11/2018 | Furuskog et al. | |
| 10,338,214 B2 | 7/2019 | Ellenbogen et al. | |
| 10,439,684 B2 | 10/2019 | Safavi et al. | |
| 11,337,235 B2 | 5/2022 | Zhang et al. | |
| 2011/0306383 A1* | 12/2011 | Lee | H04W 52/367 455/522 |

(Continued)

FOREIGN PATENT DOCUMENTS

| | | |
|---|---|---|
| CN | 105027460 A | 11/2015 |
| CN | 106817748 A | 6/2017 |

(Continued)

OTHER PUBLICATIONS

Supplementary European Search Report regarding Patent Application No. 20738064.3-1212/3911027; PCT/CN2020/070069, dated Feb. 24, 2022.

(Continued)

*Primary Examiner* — Gennadiy Tsvey
(74) *Attorney, Agent, or Firm* — Harness, Dickey & Pierce, P.L.C.

(57) ABSTRACT

An antenna panel control method includes: determining a first antenna panel that is to be turned off; and controlling the first antenna panel to be in an off state; wherein the determining a first antenna panel that is to be turned off includes: receiving a first notification message sent by a network side device; and determining the first antenna panel according to the first notification message; where the first notification message includes downlink measurement information.

20 Claims, 3 Drawing Sheets

Determine a first antenna panel that is to be turned off — 201

Control the first antenna panel to be in an off state — 202

(56) References Cited

U.S. PATENT DOCUMENTS

| | | | |
|---|---|---|---|
| 2013/0051261 A1* | 2/2013 | Kazmi | H04W 52/0277 |
| | | | 370/252 |
| 2013/0162476 A1 | 6/2013 | Thomas et al. | |
| 2018/0183503 A1* | 6/2018 | Rahman | H04B 7/0645 |
| 2019/0007121 A1* | 1/2019 | Zhinong | H04B 17/29 |
| 2019/0049577 A1 | 2/2019 | Iida et al. | |
| 2019/0181942 A1* | 6/2019 | Tang | H04L 5/0057 |
| 2019/0289530 A1 | 9/2019 | Ko et al. | |
| 2019/0312628 A1* | 10/2019 | Bergström | H04B 7/0617 |
| 2020/0029274 A1* | 1/2020 | Cheng | H04W 76/28 |
| 2020/0106168 A1* | 4/2020 | Hakola | H01Q 1/246 |
| 2020/0107341 A1* | 4/2020 | Zhang | H04W 72/23 |
| 2021/0076324 A1* | 3/2021 | Kaikkonen | H04B 7/0617 |
| 2021/0153215 A1* | 5/2021 | Guan | H04L 67/303 |
| 2021/0168714 A1* | 6/2021 | Guan | H04B 7/0404 |
| 2021/0314128 A1* | 10/2021 | Li | H04L 5/0091 |
| 2021/0336737 A1* | 10/2021 | Li | H04L 5/0094 |

FOREIGN PATENT DOCUMENTS

| | | |
|---|---|---|
| CN | 107563083 A | 1/2018 |
| CN | 107980101 A | 5/2018 |
| CN | 108540189 A | 9/2018 |
| CN | 108702188 A | 10/2018 |
| CN | 109031456 A | 12/2018 |
| CN | 110603852 A | 12/2019 |
| EP | 2401882 A2 | 1/2012 |
| EP | 2724480 A2 | 4/2014 |
| EP | 2724480 B1 * | 8/2015 ........... H04B 7/0404 |
| JP | 2017191033 A | 10/2017 |
| WO | WO-2010098593 A2 | 9/2010 |
| WO | WO-2010098593 A3 | 11/2010 |
| WO | WO-2012177218 A2 | 12/2012 |
| WO | WO-2012177218 A3 | 2/2013 |
| WO | WO-2013099997 A1 | 7/2013 |
| WO | WO-2020020453 A1 * | 1/2020 ........... H04B 7/0617 |
| WO | WO-2020062971 A1 | 4/2020 |

OTHER PUBLICATIONS

"Enhancements on multi-beam operation," ZTE, 3GPP TSG RAN WG1 Meeting #95, R1-1812257, dated Nov. 16, 2018.

International Search Report and Written Opinion of the International Searching Authority regarding International Patent Application No. PCT/CN2020/070069, dated Mar. 23, 2020. Translation provided by Bohui Intellectual Property.

First Office Action regarding Chinese Patent Application No. 201910017401.0, dated Nov. 30, 2020. Translation provided by Bohui Intellectual Property.

First Office Action regarding Japanese Patent Application No. 2021-539527, dated Aug. 5, 2022. Translation provided by Bohui Intellectual Property.

"Enhancements on multi-beam operation," Huawei, HiSilicon, 3GPP TSG RAN WG1 Meeting #95, R1-1812244, dated Nov. 16, 2018.

"Support of power efficient panel switch UE feature," Qualcomm Incorporated, 3GPP TSG RAN Meeting 80, RP-180678, dated Jun. 14, 2018.

* cited by examiner

ANTENNA PANEL CONTROL METHOD, TERMINAL DEVICE, AND NETWORK SIDE DEVICE

CROSS-REFERENCE TO RELATED APPLICATIONS

This application is a Bypass Continuation Application of PCT/CN2020/070069 filed on Jan. 2, 2020, which claims priority to Chinese Patent Application No. 201910017401.0 filed on Jan. 8, 2019, which are incorporated herein by reference in their entirety.

TECHNICAL FIELD

The present disclosure relates to the field of communications technologies, and in particular, to an antenna panel control method, a terminal device, and a network side device.

BACKGROUND

Radio access technology standards such as Long Term Evolution (LTE), or LTE-Advanced (LTE-A) are all constructed on the basis of technologies of Multiple-Input Multiple-Output (MIMO) and Orthogonal Frequency Division Multiplexing (OFDM). The MIMO technology improves a peak rate and system spectrum utilization by using a spatial degree of freedom available in a multiple-antenna system.

In a standardization development process, dimensions of the MIMO technology are constantly expanded. In LTE Rel-8, a maximum of 4 layers of MIMO transmission can be supported. In Rel-9, in an enhanced multi-user multiple-input multiple-output (MU-MIMO) technology, a maximum of 4 downlink data layers can be supported in MU-MIMO transmission of a transmission mode (TM)-8. In Rel-10, a transmission capability of single-user multiple-input multiple-output (SU-MIMO) is expanded to a maximum of 8 data layers.

The industry is further pushing the MIMO technology towards a three-dimensional and large-scale direction. 3GPP has completed a research project of 3D channel modeling, and is conducting research and standardization work of enhanced full-dimension multiple-input multiple-output (eFD-MIMO) and new radio multiple-input multiple-output (NR MIMO). It may be predicted that the MIMO technology with a larger scale and more antenna ports will be introduced in a future 5G mobile communications system.

However, as the number of antenna panels of a terminal device increases, power consumption of the terminal device becomes larger. How to reduce power consumption of the terminal device has become an urgent problem to be solved.

SUMMARY

Embodiments of the present disclosure provide an antenna panel control method, a terminal device, and a network side device.

According to a first aspect, an embodiment of the present disclosure provides an antenna panel control method, applied to a terminal device including at least two antenna panels, and including:
determining a first antenna panel that is to be turned off; and
controlling the first antenna panel to be in an off state.

According to a second aspect, an embodiment of the present disclosure provides an antenna panel control method, applied to a network side device, and including:
determining a first antenna panel that is to be turned off on a terminal device.

According to a third aspect, an embodiment of the present disclosure further provides a terminal device, where the terminal device includes at least two antenna panels, and includes:
a first determining module, configured to determine a first antenna panel that is to be turned off; and
a control module, configured to control the first antenna panel to be in an off state.

On the fourth aspect, an embodiment of the present disclosure further provides network side device, including:
a second determining module, configured to determine a first antenna panel that is to be turned off on a terminal device.

According to a fifth aspect, the present disclosure further provides a terminal device, including: a memory, a processor, and a program stored in the memory and executable on the processor, where the program, when executed by the processor, implements the steps in the foregoing antenna panel control method.

According to a sixth aspect, the present disclosure further provides a network side device, including: a memory, a processor, and a program stored in the memory and executable on the processor, where the program, when executed by the processor, implements the steps of the foregoing antenna panel control method.

According to a seventh aspect, the present disclosure further provides a non-transitory computer readable storage medium. The non-transitory computer readable storage medium stores a computer program, and when the computer program is executed by a processor, steps of the foregoing antenna panel control method are implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "and/or" herein is merely used to describe an association relationship of associated objects, which represents three kinds of relationships. For example, the phrase "A and/or B" represents three conditions: A exists alone, both A and B exist, and B exists alone.

As used herein, the singular form "a" and "an" are intended to include the plural forms as well, unless the context clearly indicates otherwise.

Figure 1:
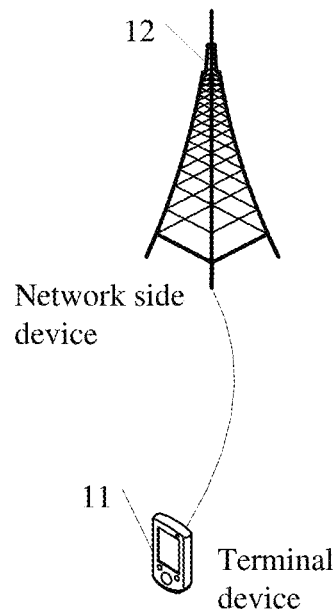
FIG. 1 is a structural diagram of a network system to which embodiments of the present disclosure can be applied.

Referring to FIG. 1, FIG. 1 is a schematic diagram of a network structure to which an embodiment of the present disclosure can be applied. As shown in FIG. 1, the network structure includes a terminal device (UE) 11 and a network side device 12, where the terminal device 11 may be a terminal side device such as a mobile phone or an in-vehicle terminal. It should be noted that a specific type of the terminal device 11 is not limited in this embodiment of the present disclosure. The network side device 12 may be a base station, for example, a macro base station, an LTE evolved node base station (eNB), a 5-th generation (5G) New Radio (NR) NB, or the like. The network side device 12 may alternatively be a small cell, for example, a low power node (LPN), a pico cell, or a femto cell, or the network side device 12 may be an access point (AP). The base station may alternatively be a network node including a central unit (CU) and a plurality of transmission reception points (TRP) managed and controlled by the central unit. It should be noted that a specific type of the network side device 12 is not limited in this embodiment of the present disclosure.

Figure 2:
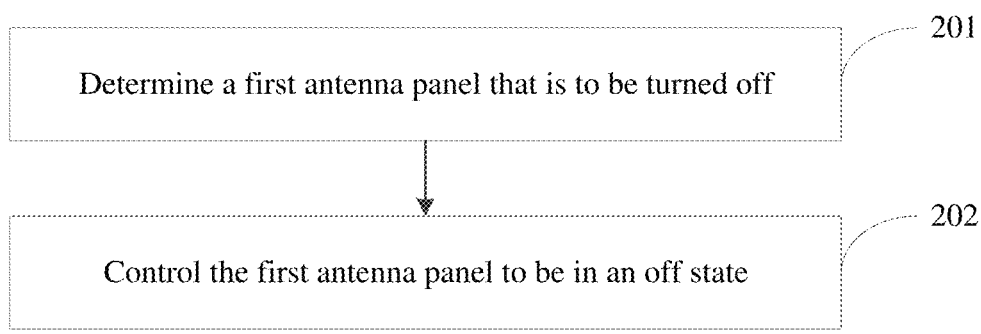
FIG. 2 is a first flowchart of an antenna panel control method according to an embodiment of the present disclosure.

Referring to FIG. 2, FIG. 2 is a flowchart of an antenna panel control method according to an embodiment of the present disclosure. As shown in FIG. 2, the method includes the following steps:

Step 201: Determine a first antenna panel that is to be turned off.

Step 202: Control the first antenna panel to be in an off state.

The panel control method provided in the embodiments of the present disclosure is applied to a terminal device including at least two antenna panels. After the terminal device is turned on, each antenna panel may be configured to be in the on state, that is, uplink (UL) or downlink (DL) transmission may be performed through any antenna panel. The antenna panel specifically refers to: a reference signal (RS) resource set, a beam set, an antenna panel explicitly defined by network, a terminal radio frequency channel, spatial relation information, a group of downlink reference signal resources (a group of DL RS resources), a group of transmission configuration indicator (TCI) states, a unit of power control, a unit of timing control, or the like.

For example, in the embodiments, the first antenna panel that is to be turned off may be actively selected and controlled by the user, and may also be controlled by the network side device. It further may be agreed in advance in a protocol that an antenna panel that meets a preset conditions is determined as the first antenna panel that is to be turned off. When the user actively selects and controls the first antenna panel that is to be turned off on the terminal device, the on state or the off state of each antenna panel may be set through a specified setting interface. After the first antenna panel is determined, the panel information of the first antenna panel is indicated to the network side device. When the first antenna panel that needs to be turned off is controlled by the network side device, the network side device may indicate the panel information of the first antenna panel to the terminal device.

After the terminal device determines the first antenna panel that is to be turned off, the first antenna panel may be turned off. Specific behavior of turning off the first antenna panel is described in detail in the embodiments below. It should be noted that the first antenna panel may be some or all antenna panels of the terminal device. It should be understood that the first antenna panel usually refers to an antenna panel that may have very poor network channel quality. This antenna panel consumes a lot of power and time-frequency resources, but contributes little communication quality, resulting in a waste of energy and time-frequency resources.

In the embodiments of the present disclosure, after the first antenna panel that is to be turned off is determined, the first antenna panel is turned off. In this way, some or all of antenna panels of the terminal device may be turned off, thereby reducing power consumption of the terminal device and increasing standby time of the terminal device.

In an optional embodiment, the network side device may control the first antenna panel that needs to be turned off. For example, the network side device may send the first notification message to the terminal device to indicate the first antenna panel that needs to be turned off. For example, in the embodiments, step 201 includes:

receiving a first notification message sent by a network side device; and determining the first antenna panel according to the first notification message.

In this embodiment, the first notification message may directly notify the terminal device of the first antenna panel that is to be turned off, and may also indirectly notify the terminal device of the first antenna panel that is to be turned off. Detailed descriptions are as follows.

It should be noted that the first notification message may be sent through any one of physical layer signaling, medium access control (MAC) signaling, and radio resource control (RRC) signaling.

Solution 1: The network side device directly informs, through the first notification message, the terminal device of the first antenna panel that is to be turned off.

In solution 1, the first notification message may be notified in any one of the following manners.

manner 1: instructing a second antenna panel to be in an on state, where the second antenna panel is an antenna panel of all antenna panels of the terminal device other than the first antenna panel;

manner 2: instructing the first antenna panel to be in the off state;

manner 3: instructing the first antenna panel to be in the off state, and instructing the second antenna panel to be in the on state;

manner 4: instructing a third antenna panel to switch from the on state to the off state, where the third antenna panel is at least one antenna panel of antenna panels that are currently in the on state; and manner 5: instructing a fourth antenna panel to switch from the off state to the on state, where the fourth antenna panel is at least one antenna panel of antenna panels that are currently in the off state.

In manner 1, the first notification message may indicate antenna panels that are in the on state, to determine that an antenna panel that has not been indicated is the first antenna panel. In manner 2, the first notification message may indicate antenna panels that are in the off state, to determine that the indicated antenna panels are the first antenna panel. In manner 3, the first notification message may indicate antenna panels that are in the off state and antenna panels that are in the on state, to determine that the antenna panels that are indicated as being in the off state are the first antenna panel. In manner 4 and manner 5, an antenna panel that switches between states is indicated. For example, in manner 4, an antenna panel in the on state is adjusted to be in the off state. In this case, it may be determined that the antenna panel that is previously in the off state and an antenna panel indicated by the first notification message are the first antenna panel. In manner 5, an antenna panel that is in the off state is adjusted to be in the on state. In this case, it may be determined that an antenna panel that is previously in the off state other than the antenna panel in the first notification message is the first antenna panel.

Solution 2: The network side device indirectly informs, through the first notification message, the terminal device of the first antenna panel that is to be turned off.

In solution 2, the first notification message may include at least one of downlink measurement information, a sounding reference signal (SRS) initially configured by the network side device for the terminal device, an SRS configured and activated by the network side device for the terminal device, or target information;

where the target information is initial configuration information or activation configuration information used by the terminal device to receive data, or the target information is initial configuration information or activation configuration information used by the terminal device to receive control information.

In the embodiments, the first notification message may include one or more of downlink measurement information, a sounding reference signal SRS initially configured by the network side device for the terminal device, an SRS configured and activated by the network side device for the terminal device, and target information, to indicate the first antenna panel. Detailed descriptions are as follows.

For example, in an optional implementation, when the first notification message includes downlink measurement information and a first target parameter, step 201 includes any one of the following:

determining that an antenna panel corresponding to panel information that is not included in the downlink measurement information is the first antenna panel;

determining that an antenna panel corresponding to panel information that is not included in the first target parameter is the first antenna panel, where the first target parameter is a sounding reference signal SRS initially configured for the terminal device or an SRS configured and activated by the network side device for the terminal device; and determining that an intersection set or a union set of an antenna panel corresponding to panel information that is not included in the downlink measurement information and an antenna panel corresponding to panel information that is not included in the first target parameter is the first antenna panel.

In this implementation, the first antenna panel may be indicated by one of the downlink measurement information or the first target parameter, or the first antenna panel may be indicated by both the downlink measurement information and the first target parameter. For example, when the first antenna panel is indicated by both the downlink measurement information and the first target parameter, an antenna panel corresponding to panel information that is not included in both the downlink measurement information and the first target parameter may be determined as the first antenna panel; or an antenna panel corresponding to panel information that is not included in the downlink measurement information and an antenna panel corresponding to panel information that is not included in the first target parameter may be determined as the first antenna panel.

There may be multiple types of SRSs mentioned above. For example, the SRS may include an SRS for beam management (that is, SRS for BM, BM refers to beam management), a codebook based SRS, a non-codebook based SRS, and an SRS for antenna panel selection. In the embodiments, the antenna panel corresponding to the panel information that is not included in the first target parameter is: an antenna panel corresponding to panel information that is not included in a first target object of the first target parameter, and the first target object is an SRS of all SRSs other than an SRS for beam management (that is, SRS for BM, BM refers to beam management).

The downlink measurement information includes a second target parameter, the second target parameter is a synchronization signal block (that is, synchronization signal and PBCH block, abbreviated as SSB) or a channel state information reference signal (CSI-RS), the antenna panel corresponding to the panel information that is not included in the downlink measurement information is: an antenna panel corresponding to panel information included in a first target object of the second target parameter, and the first target object is an SSB of SSBs other than an SSB for beam management (that is, SRS for BM), or a CSI-RS of CSI-RSs other than a CSI-RS for beam management (that is, CSI-RS for BM).

In another optional implementation, when the first notification message includes the target information, the determining a first antenna panel that is to be turned off includes:

determining the first antenna panel according to a third target parameter in the target information, where the third target parameter is panel information of a second antenna panel or the third target parameter is associated with a second antenna panel, and the second antenna panel is an antenna panel of all antenna panels of the terminal device other than the first antenna panel.

In this implementation, the target information includes a transmission configuration indicator state (TCI state), and the third target parameter is a parameter in the TCI state. The third target parameter is a target reference signal, and the second antenna panel is a panel corresponding to the target reference signal in the beam report.

For example, in this embodiment, the beam report may be a beam report reported by the terminal device recently, and the beam report may indicate that one or more antenna panels correspond to the target reference signal. When the target reference signal corresponds to at least two first target antenna panels, the second antenna panel is an antenna panel having a better reporting result among the at least two first target antenna panels. For example, the antenna panel having the best reporting result refers to an antenna panel having the highest reference signal received power (RSRP) or signal-to-noise and interference ratio (SINR) in the reporting result.

In another optional embodiment, the user may actively control the first antenna panel that needs to be turned off. For example, the user may choose whether to turn off the antenna panel according to different usage scenarios, or the terminal device recommends, according to the beam measurement result, an antenna panel that may be turned off, so that the user selects the first antenna panel that is to be turned off. After the first antenna panel is determined, the terminal device sends a second notification message to the network side device to notify the network side device of the first antenna panel that needs to be turned off. For example, based on the foregoing embodiment, in this embodiment, after step 201, the method further includes: sending a second notification message to the network side device, so that the network side device determines the first antenna panel according to the second notification message.

It should be noted that the second notification message may be sent through any one of physical layer signaling, medium access control (MAC) signaling, and radio resource control RRC signaling.

In this embodiment, the second notification message may directly notify the network side device of the first antenna panel that is to be turned off, and may also indirectly notify the network side device of the first antenna panel that is to be turned off. Detailed descriptions are as follows.

Solution 3: The terminal device directly informs, through the second notification message, the network side device of the first antenna panel that is to be turned off on the terminal device.

In solution 3, the second notification message may be notified in any one of the following manners.

manner 6: instructing a second antenna panel to be in an on state, where the second antenna panel is an antenna panel of all antenna panels of the terminal device other than the first antenna panel;

manner 7: instructing the first antenna panel to be in the off state;

manner 8: instructing the first antenna panel to be in the off state, and instructing the second antenna panel to be in the on state;

manner 9: instructing a third antenna panel to switch from the on state to the off state, where the third antenna panel is at least one antenna panel of antenna panels that are currently in the on state; and manner 10: instructing a fourth antenna panel to switch from the off state to the on state, where the fourth antenna panel is at least one antenna panel of antenna panels that are currently in the off state.

In manner 6, the second notification message may indicate antenna panels that are in the on state, so that the network side device may determine that an antenna panel that has not been indicated is the first antenna panel. In manner 7, the second notification message may indicate antenna panels that are in the off state, so that the network side device may determine that the indicated antenna panels are the first antenna panel. In manner 8, the second notification message may indicate antenna panels that are in the off state and antenna panels that are in the on state, so that the network side device may determine that the antenna panels that are indicated as being in the off state are the first antenna panel. In manner 9 and manner 10, an antenna panel that switches between states is indicated. For example, in manner 9, an antenna panel in the on state is adjusted to be in the off state. In this case, the network side device may determine that the antenna panel that is previously in the off state on the terminal device and an antenna panel indicated by the second notification message are the first antenna panel, or may determine that an antenna panel indicated by the second notification message is the first antenna panel. In manner 10, an antenna panel that is in the off state is adjusted to be in the on state. In this case, the network side device may determine that an antenna panel that is previously in the off state on the terminal device other than the antenna panel in the first notification message is the first antenna panel.

Solution 4: The terminal device indirectly informs, through the second notification message, the network side device of the first antenna panel that is to be turned off on the terminal device.

In solution 4, the second notification message may include at least one of a beam report or an SRS that is sent to the network side device.

When the second notification message includes the beam report, the terminal device indicates the first antenna panel to the network side device through the beam report.

For example, the first antenna panel is indicated through the beam report in any one of the following manners:

an antenna panel corresponding to panel information that is not included in the beam report is the first antenna panel;

a second target antenna panel implicitly indicated by the beam report is the first antenna panel;

an antenna panel corresponding to panel information that is not included in all beam reports sent in at least M times among beam reports sent in recent N times is the first antenna panel; and a second target antenna panel that is implicitly indicated by all beam reports sent in at least M times among beam reports sent in recent N times is the first antenna panel;

where N is an integer greater than 1, and M is a positive integer less than or equal to N.

In the embodiments, each beam report includes a measurement result of at least one antenna panel. For example, that the beam report does not include the panel information of the second target antenna panel is: the beam report does not include a measurement result of the second target antenna panel; and that the beam report implicitly indicates the second target antenna panel is: the beam report indicates that the measurement result of the second target antenna panel is lower than a preset threshold.

In addition, when the second notification message includes an SRS, the terminal device indicates the first antenna panel to the network side device through the SRS.

For example, the first antenna panel is indicated through the SRS in at least one of the following manners:

an antenna panel corresponding to panel information that is not included in the SRS is the first antenna panel;

an antenna panel corresponding to panel information that is not implicitly indicated in the SRS is the first antenna panel;

an antenna panel corresponding to panel information that is not included in all SRSs sent in at least M times among SRSs sent in recent N times is the first antenna panel; and an antenna panel corresponding to panel information that is not implicitly indicated in all SRSs sent in at least M times among SRSs sent in recent N times is the first antenna panel; or where N is an integer greater than 1, and M is a positive integer less than or equal to N.

In the embodiments, the panel information that is included in the SRS is: panel information that is included in a first target object of the SRS, and the first target object is an SRS for beam management or an SRS of all SRSs other than an SRS for beam management. An antenna panel corresponding to panel information that is implicitly indicated in an SRS that is sent at the L-th time is: an antenna panel corresponding to an SRS that is not sent at the L-th time, where L is a positive integer less than or equal to N.

It should be noted that in the embodiments, values of M and N may be configured by the network side device through physical layer signaling, medium access control MAC signaling, other higher-layer signaling, or the like. In the embodiments, the panel information may be a resource set of the SRS for beam management (that is, a resource set of SRS for BM) or the like, or may be spatial Relation Info of an SRS of all SRSs other than the SRS for beam management (that is, spatial Relation Info of other SRS) or the like.

Further, in another optional embodiment, if it is specified in a protocol in advance that the antenna panel that meets the preset condition is determined as the first antenna panel that is to be turned off, there is no need to send a notification message, thereby reducing signaling consumption.

In this embodiment, step 201 includes: determining the first antenna panel that has not performed uplink and/or downlink transmission for a preset duration.

For example, a manner of collecting statistics on time during which there is no uplink transmission and/or downlink transmission may be set according to actual needs. For example, in the embodiments, the network side device and the terminal device may use a counter and a timer to collect statistics on the time during which there is no uplink transmission, or no downlink transmission, or neither uplink nor downlink transmission. For example, there is no uplink transmission. The timer is restarted every time uplink transmission occurs. When the timer reaches a maximum threshold configured in a network, it is considered that the terminal device has no uplink transmission for a period of time. Alternatively, an additional counter is used. When the timer reaches the maximum threshold configured in a network, the counter counts once and the timer restarts. When the counter reaches a maximum threshold configured in a network, it is considered that the terminal device has no uplink transmission for a period of time.

Further, the counter may collect statistics on continuous non-transmission, that is, when transmission occurs, the counter restarts; or the counter collects statistics on non-transmission within a period of time T, that is, when transmission occurs, the counter does not restart, but only does not count; as time moves on, the counter discards statistics that are away from the current time by more than T.

The network side device and the terminal device can determine, in the foregoing manner, the first antenna panel that has not performed uplink and/or downlink transmission for a preset duration. After the terminal device determines the first antenna panel, the terminal device can control some or all antenna panels of the first antenna panel to be in the off state. It should be noted that in this embodiment, when the terminal device includes the second antenna panel other than the first antenna panel, the terminal device can control all antenna panels belonging to the first antenna panel to be in the off state. When all the antenna panels of the terminal device are first antenna panels, the terminal device can control some antenna panels of the first antenna panel to be in the off state. In this way, it may be ensured that the terminal device may still communicate normally after turning off the antenna panel.

It should be noted that a length of the preset duration may be controlled by radio resource control, medium access control element (MAC CE), or downlink control information (DCI).

For example, in this embodiment, not performing uplink transmission includes: neither data information nor control information is sent on the first antenna panel.

An SRS can also be transmitted on the first antenna panel. There may be multiple types of SRSs mentioned above. For example, the SRS may include an SRS for beam management (that is, SRS for BM, BM refers to beam management), a codebook based SRS, a non-codebook based SRS, and an SRS for antenna panel selection. In an optional embodiment, transmission of the SRS for beam management may be a special case, and may not be a special case. The transmission of the SRS for beam management can be regarded as performing uplink transmission, or the transmission of the SRS for beam management can also be regarded as not performing uplink transmission. That is, not performing uplink transmission includes or does not include: sending a target sounding reference signal SRS on the first antenna panel, where the target SRS is an SRS for beam management. When the SRS for beam management may be used as a special case, the transmission of the SRS for beam management can also be regarded as not performing uplink transmission.

In this embodiment, the third target antenna panel of the first antenna panel is in the off state, and if the target SRS needs to be sent on the third target antenna panel, the third target antenna panel may be temporarily turned on to send the target SRS. For example, after step 202, the method may further include:

sending a target SRS on the third target antenna panel, where the target SRS is an SRS for beam management.

After the target SRS is sent, the third target antenna panel is turned off again.

When the target SRS is sent on the third target antenna panel, a transmission delay of the network side device includes an additional delay, and the additional delay is used to indicate time for turning on the first antenna panel.

In the above case, the delay that the network side device needs to reserve must be long enough to satisfy the time for turning on the third target antenna panel. The terminal device may report the time for turning on the third target antenna panel to the network side device, or the time for turning on the third target antenna panel may be specified in a protocol in advance. In the embodiments, the target SRS may be aperiodic.

Further, repetition setting of the second target object is the on state.

Further, based on the above-mentioned embodiments, in this embodiment, before step 201, the method further includes:

receiving target information sent by the network side device.

where the target information is initial configuration information or activation configuration information used by the terminal device to receive data, or the target information is initial configuration information or activation configuration information used by the terminal device to receive control information.

In the embodiments, a third target parameter of the target information includes or implicitly indicates panel information of the second antenna panel, and the second antenna panel is an antenna panel of antenna panels of the terminal device other than the first antenna panel. The network side device uses the target information to configure the panel information of the second antenna panel used by the terminal device for downlink transmission. The terminal device and the network side device may determine, according to the configured panel information of the second antenna panel, whether downlink transmission is performed.

For example, the target information includes a transmission configuration indicator state TCI state, and the third target parameter is a parameter in the TCI state. The third target parameter is a target reference signal, and the second antenna panel is an antenna panel corresponding to the target reference signal in the beam report.

In this embodiment, the beam report may be a beam report reported by the terminal device recently, and the beam report may indicate that one or more antenna panels correspond to the target reference signal. When the target reference signal corresponds to at least two first target antenna panels, the second antenna panel is an antenna panel having a better reporting result among the at least two first target antenna panels. For example, the antenna panel having the best reporting result refers to an antenna panel having the highest RSRP or SINR in the reporting result.

A synchronization signal block SSB or a channel state information reference signal CSI-RS for beam management can also be transmitted on the first antenna panel. There can be multiple types of SSBs or CSI-RSs. For example, the SSB or the CSI-RS may include an SSB or a CSI-RS for beam management (that is, SSB/CSI-RS for BM, BM refers to beam management), a codebook based SRS or CSI-RS, a non-codebook based SRS or CSI-RS, and an SRS or a CSI-RS for antenna panel selection.

In an optional embodiment, transmission of the SRS or the CSI-RS for beam management may be a special case, and may not be a special case. Reception of the SRS or the CSI-RS for beam management can be regarded as performing downlink transmission, or reception of the SRS or the CSI-RS for beam management can also be regarded as not performing downlink transmission. That is, not performing downlink transmission includes or does not include: receiving a second target object on the first antenna panel, where the second target object is an SSB or a CSI-RS for beam management. When the SRS or the CSI-RS for beam management may be used as a special case, reception of the SRS or the CSI-RS for beam management can also be regarded as not performing downlink transmission.

In this embodiment, the fourth target antenna panel of the first antenna panel is in the off state, and if the second target object needs to be received on the fourth target antenna panel, the fourth target antenna panel may be temporarily turned on to receive the second target object. For example, after step 202, the method may further include:

when the fourth target antenna panel of the first antenna panel is in the off state, controlling the fourth target antenna panel to turn on.

The second target object is sent on the fourth target antenna panel, and the second target object is a synchronization signal block SSB or a channel state information reference signal CSI-RS for beam management.

After the second target object is sent, the fourth target antenna panel is turned off again.

During sending of the second target object on the fourth target antenna panel, a transmission delay of the network side device includes an additional delay, and the additional delay is used to indicate time for turning on the first antenna panel.

In the above case, the delay that the network side device needs to reserve must be long enough to satisfy the time for turning on the fourth target antenna panel. The terminal device may report the time for turning on the fourth target antenna panel to the network side device, or the time for turning on the fourth target antenna panel may be specified in a protocol in advance.

It should be noted that in the embodiments, the second target object may be aperiodic; the repetition setting of the second target object may be the on state.

The second target object includes an SSB or a CSI-RS. For example, for an aperiodic SSB/CSI-RS for BM whose repetition setting is configured as "off" (repetition is "off", that is, P2), the terminal device cannot use the first antenna panel to receive the second target object; for an aperiodic SSB/CSI-RS for BM whose repetition setting is configured as "on" (repetition is "on", that is, P1 or P3), the terminal device may use the panel to receive the second target object.

If it is specified in a protocol in advance that the antenna panel that meets the preset condition is determined as the first antenna panel that is to be turned off, in order to ensure a normal communication function, the terminal device needs to ensure that at least one antenna panel is in the on state. For example, in this embodiment, step 202 includes: if the terminal device includes the second antenna panel other than the first antenna panel, controlling all antenna panels belonging to the first antenna panel to be in the off state; or if the terminal device does not include the second antenna panel other than the first antenna panel, controlling a fifth target antenna panel of the first antenna panel to be in the off state, and controlling a sixth target antenna panel of the second antenna panel to be in the on state.

In this embodiment, when all the antenna panels of the terminal device do not perform uplink and/or downlink transmission for a preset duration (that is, the first antenna panel is all the antenna panels in the terminal device), the remaining antenna panel other than the antenna panel that needs to be turned on by default (that is, the sixth antenna panel) is turned off.

For example, in the embodiments, the sixth antenna panel is any one of the following antenna panels:

an antenna panel that receives a physical uplink control channel (PUCCH);

a corresponding antenna panel that receives a physical uplink shared channel (PUSCH);

an antenna panel that receives a physical downlink control channel PDCCH;

a corresponding antenna panel that receives a physical downlink shared channel PDSCH;

a most recently scheduled antenna panel; and an antenna panel corresponding to the best beam.

The antenna panel 1 may be a panel corresponding to spatial relation information of a PUCCH with the smallest ID in dedicated PUCCH resources (that is, the panel corresponding to the spatial relation info of the corresponding PUCCH with the smallest ID in dedicated PUCCH resources). The antenna panel 3 may be an antenna panel corresponding to a first control resource set (that is, a panel corresponding to CORESET #0) or all panels used for receiving a PDCCH. The antenna panel 4 may be an antenna panel corresponding to a PUSCH default beam scheduled by downlink control information in a format 0-0 (that is, the panel corresponding to the PUSCH default beam scheduled by DCI 0-0).

Further, after the first antenna panel is determined, the first antenna panel may be turned off. For example, in the embodiment, the step 202 may include:

turning off a sending module and/or a receiving module of the first antenna panel.

In this embodiment, when the first antenna panel is turned off, only the sending module may be turned off, or only the receiving module may be turned off, or the sending module and the receiving module may be turned off at the same time. The turning off a sending module of the first antenna panel includes:

skipping transmitting uplink service data and/or control information on the first antenna panel;

allowing or not allowing transmission of a codebook based SRS and a non-codebook based SRS on the first antenna panel;

allowing or not allowing sending of an SRS for beam management on the first antenna panel;

where during transmission of a codebook based SRS, a non-codebook based SRS, or an SRS for beam management on the first antenna panel, a transmission delay of the network side device includes an additional delay, and the additional delay is used to indicate time for turning on the first antenna panel.

In these embodiments, a codebook based SRS, a non-codebook based SRS, and an SRS for beam management are special cases of transmission. A corresponding SRS may be allowed or may not be allowed to be transmitted on the first antenna panel. For example, when the SRS for beam management is allowed to be sent on an antenna panel of the first antenna panel, the antenna panel may be temporarily turned on when the SRS for beam management needs to be sent, then the SRS for beam management is sent on the antenna panel, and then the antenna panel is turned off. In the above case, the delay that the network side device needs to reserve must be long enough to satisfy the time for turning on the antenna panel. The terminal device may report the time for turning on the antenna panel to the network side device, or the time for turning on the antenna panel may be specified in a protocol in advance.

It should be noted that in this embodiment, an SRS that is allowed to be sent and that is used for beam management on the first antenna panel is aperiodic. Further, the terminal device may use the first antenna panel to transmit all types or some types of aperiodic SRSs for BM. For example, three types of aperiodic SRSs for BM may include: the network side device and the terminal device both change the beam direction; only the terminal device changes the beam direction; only the network side device changes the beam direction.

Further, the turning off a receiving module of the first antenna panel includes:

skipping transmitting downlink service data and/or control information on the first antenna panel;

allowing or not allowing reception of a reference signal corresponding to first downlink channel state information CSI on the first antenna panel, where the reference signal corresponding to the first downlink CSI is a reference signal not for beam management; and allowing or not allowing reception of a reference signal corresponding to second CSI on the first antenna panel, where the reference signal corresponding to the second CSI is a reference signal for beam management;

where during reception of the reference signal corresponding to the first downlink CSI or the reference signal corresponding to the second downlink CSI on the first antenna panel, a transmission delay of the network side device includes an additional delay, and the additional delay is used to indicate time for turning on the first antenna panel.

In the embodiments, the reference signal corresponding to the first CSI and the reference signal corresponding to the second CSI are special cases of receiving, and may be allowed or may not be allowed to be received on the first antenna panel. For example, when the corresponding reference signal is allowed to be received on an antenna panel of the first antenna panel, the antenna panel may be temporarily turned on when the corresponding reference signal needs to be received, then the corresponding reference signal is received on the antenna panel, and then the antenna panel is turned off. In the above case, the delay that the network side device needs to reserve must be long enough to satisfy the time for turning on the antenna panel. The terminal device may report the time for turning on the antenna panel to the network side device, or the time for turning on the antenna panel may be specified in a protocol in advance.

Further, when it is necessary to receive the reference signal corresponding to the first CSI and/or the reference signal corresponding to the second CSI on the first antenna panel, and it is also necessary to transmit at least one of the codebook based SRS, the non-codebook based SRS, and the SRS for beam management on the first antenna panel, the reception or the transmission are performed at moments that are as close as possible, to avoid turning on the first antenna panel for multiple times and reduce the time of turning on the first antenna panel.

It should be noted that in an embodiment, the reference signal corresponding to the second CSI that is allowed to be received on the first antenna panel may be aperiodic, or may be periodic or semi-periodic. In another embodiment, the reference signal corresponding to the second CSI is only aperiodic.

Further, in an embodiment, the repetition setting of the reference signal corresponding to the second CSI is the on state or the off state.

For example, the reference signal corresponding to the second CSI includes an SSB or a CSI-RS. For example, for an aperiodic SSB/CSI-RS for BM whose repetition setting is configured as "off" (repetition is "off", that is, P2), the terminal device cannot use the first antenna panel to receive the reference signal corresponding to the second CSI; for an aperiodic SSB/CSI-RS for BM whose repetition setting is configured as "on" (repetition is "on", that is, P1 or P3), the terminal device may use the panel to receive the reference signal corresponding to the second CSI.

It should be noted that the second antenna panel of the terminal device other than the first antenna panel is in the on state. For example, that the second antenna panel is in the on state is: allowing transmission of service data, control information, and a reference signal on the second antenna panel.

It should be noted that the plurality of optional implementations described in the embodiments of the present disclosure may be implemented in combination with each other or may be implemented separately. This is not limited in the embodiments of the present disclosure.

Furthermore, in order to better understand the present disclosure, the following describes three different implementation processes of determining the first antenna panel by the network side device, actively selecting the first antenna panel by the user, or determining the first antenna panel based on time in detail.

In an embodiment, the process of determining the first antenna panel by the network side device is as follows:

Step 1: The network side device notifies the terminal device to turn off the first antenna panel.

In step 1, there are notification manner 1 and notification manner 2, where manner 1 is that the network side device explicitly informs the terminal device to turn off the first antenna panel through explicit signaling; manner 2 is that the network side device indirectly informs the terminal device to turn off the first antenna panel.

In the above notification manner 1, the explicit signaling may include: physical layer signaling, medium access control signaling, or radio resource control signaling. The explicit signaling may use any of the following manners to indicate the first antenna panel:

a) indicate panels that are in the on state;
b) indicate panels that are in the off state;
c) indicate the on state and the off state of all panels; and
d) indicate panels that switch from the on state to the off state or panels that switch from the off state to the on state.

In the above notification manner 2, DL measurement information and/or a designated SRS configured for the terminal device by the network side device may indirectly inform the terminal device of the first antenna panel that is turned off, and the designated SRS is an SRS configured and activated by the network side device for the terminal device or an SRS initially configured by the network side device for the terminal device.

For example, in a first implementation, it may be determined that a panel corresponding to panel information that is not included in the DL measurement information is the first antenna panel; in a second implementation, it may be determined that a panel corresponding to panel information that is not included in the designated SRS is the first antenna panel; in a third implementation, it may be determined that a panel corresponding to panel information that is not included in both the DL measurement information and the designated SRS is the first antenna panel.

Further, determining that a panel corresponding to panel information that is not included in the DL measurement information is the first antenna panel refers to: a panel corresponding to panel information that is not included in the measurement information of the DL measurement information other than the measurement information used to measure the SSB/CSI-RS for BM is the first antenna panel. That a panel corresponding to panel information that is not included in the designated SRS is the first antenna panel refers to: the panel corresponding to panel information that is not included in the SRS of the designated SRSs other than an SRS for BM is the first antenna panel.

In the above manner 2, the panel information that is not included or implicitly indicated in the target information further may indirectly inform the terminal device of the first antenna panel that is to be turned off. The target information is information configured by the network side device for data receiving or control information receiving.

For example, the target information includes a TCI state, and the panel information that is not included or implicitly indicated in the target information refers to: the panel information that is not included or implicitly indicated in the TCI state. The panel information that is implicitly indicated in the TCI state refers to: the panel information corresponding to the RS in the TCI state, and the panel information may be a receiving panel corresponding to the RS in a recent beam report. If results of receiving the RS on multiple panels are reported in the beam report, the panel is a panel having the best reporting result (the highest RSRP and SINR).

Step 2: The terminal device turns off the first antenna panel (For the specific implementation process, refer to the foregoing embodiment. Details are not limited herein again).

In another implementation, the process of determining the first antenna panel by the user may be as follows:

Step 3: The terminal device informs the network side device of the first antenna panel that needs to be turned off on the terminal device.

In step 3, there are notification manner 1 and notification manner 2, where manner 1 is that the network side device explicitly informs the terminal device to turn off the first antenna panel through explicit signaling; manner 2 is that the network side device indirectly informs the terminal device to turn off the first antenna panel.

In the above notification manner 1, the explicit signaling may include: physical layer signaling, medium access control signaling, or other higher-layer signaling. The explicit signaling may use any of the following manners to indicate the first antenna panel:

a) indicate panels that are in the on state;
b) indicate panels that are in the off state;
c) indicate the on state and the off state of all panels; and
d) indicate panels that switch from the on state to the off state or panels that switch from the off state to the on state.

In the above notification manner 2, for DL BM, the terminal device may indirectly indicate the panel information through a beam report; for UL BM, the terminal device may indicate the panel information through an SRS.

For example, for DL BM, a beam report of a current time of BM or all beam reports of N times of BM may indicate that a panel is poor; or a beam report of a current time of BM or all beam reports of N times of BM does/do not include information of a panel. In this implementation, a beam measurement result corresponding to at least one panel is reported. The above N times can be N times in the beam reports reported for M consecutive times. M and N may be configured by the network side device through physical layer signaling, medium access control signaling, other higher-layer signaling, or the like.

For UL BM, the terminal device may indicate the first antenna panel through panel information that is not included or implicitly included in the SRS sent this time or for N times. For example, the panel information may be a resource set of the SRS for BM, or spatial relation Info of other SRS. In this implementation, an SRS corresponding to at least one panel is sent. The above N times can be N times in the beam reports reported for M consecutive times. M and N may be configured by the network side device through physical layer signaling, medium access control signaling, other higher-layer signaling, or the like.

Step 4: The terminal device turns off the first antenna panel (For the specific implementation process, refer to the foregoing embodiment. Details are not limited herein again).

In another implementation, the process of determining the first antenna panel based on time may be as follows:

Step 5: Determine the first antenna panel based on uplink and/or downlink transmission.

In step 5, the antenna panel that has no uplink transmission for a period of time may be determined as the first antenna panel; or the antenna panel that has no downlink transmission for a period of time may be determined as the first antenna panel; or the antenna panel that has neither uplink transmission nor downlink transmission for a period of time may be determined as the first antenna panel.

For example, for uplink transmission, when the terminal device uses a panel for uplink transmission during a period of detection time, the panel is in the on state; if the terminal device does not use the panel for uplink transmission during a period of detection period, both the network side device and the terminal device consider that the Panel is in the off state, and the terminal device turns off the panel.

Uplink transmission includes data information and control information, and setting of the above detection time may be controlled by RRC, a MAC CE, or DCI.

Further, in an optional solution, special uplink transmission further may be considered, and special uplink transmission includes using the panel to send the SRS for BM. For example, the SRS for BM may be aperiodic. Using the panel to send the SRS for BM may refer to: the terminal device uses the panel to transmit all types or some types of aperiodic SRSs for BM.

When the special uplink transmission occurs, the terminal device and the network side device may consider that the terminal device does not use the panel for uplink transmission.

When the panel is in the off state, the terminal device may temporarily use the panel to complete the task of special uplink transmission, and then the terminal device turns off the panel. In the embodiments, the network side device needs to consider the required time of temporarily turning on the panel, and reserves a sufficient delay. In addition, the terminal device may inform the network side device of the required time of turning on the panel; or the network side device defaults the required time of turning on the panel by the terminal device.

It should be noted that, in order to ensure normal communication, at least one panel of the terminal device is in the on state. If there is no uplink transmission on all the panels within a period of detection time, a default panel keeps turning on. The default panel may be a panel that sends a PUCCH (for example, a panel corresponding to spatial relation info corresponding to a PUCCH having the smallest ID in dedicated PUCCH resources); may also be a corresponding panel that sends a PUSCH (a panel corresponding to a PUSCH default beam scheduled by DCI 0-0); may be the most recently scheduled panel; or may be a panel corresponding to the best beam.

For downlink transmission, when the terminal device uses a panel for downlink transmission during a period of detection time, the panel is in the on state; if the terminal device does not use the panel for downlink transmission during a period of detection period, both the network side device and the terminal device consider that the panel is in the off state, and the terminal device turns off the panel.

For example, the network side device may instruct, through the target information, the terminal device to receive data or control information. The target information includes a TCI state, and the panel information that is not included or implicitly indicated in the target information refers to: the panel information that is not included or implicitly indicated in the TCI state. The panel information that is implicitly indicated in the TCI state refers to: the panel information corresponding to the RS in the TCI state, and the panel information may be a receiving panel corresponding to the RS in a recent beam report. If results of receiving the RS on multiple panels are reported in the beam report, the panel is a panel having the best reporting result (the highest RSRP and SINR).

If the terminal device does not use a panel for downlink transmission during a period of detection period, both the network side device and the terminal device consider that the panel is in the off state, and the terminal device turns off the panel. Setting of the above detection time may be controlled by RRC, a MAC CE, or DCI.

Further, in an optional solution, special downlink transmission further may be considered, and special downlink transmission includes using the panel to receive the SSB/CSI-RS for BM. For example, the SSB/CSI-RS for BM may be aperiodic, for example, an aperiodic SSB/CSI-RS for BM whose repetition setting is "on" (repetition is "on", that is, P1 or P3). Using the panel to receive the SSB/CSI-RS for BM may refer to: the terminal device uses the panel to receive all types or some types of aperiodic SSB/CSI-RS for BM.

When the special downlink transmission occurs, the terminal device and the network side device may consider that the terminal device does not use the panel for uplink transmission.

When the panel is in the off state, the terminal device may temporarily use the panel to complete the task of special downlink transmission, and then the terminal device turns off the panel. In the embodiments, the network side device needs to consider the required time of temporarily turning on the panel, and reserves a sufficient delay. In addition, the terminal device may inform the network side device of the required time of turning on the panel; or the network side device defaults the required time of turning on the panel by the terminal device.

It should be noted that, in order to ensure normal communication, at least one panel of the terminal device is in the on state. If there is no downlink transmission on all the panels within a period of detection time, a default panel keeps turning on. The default panel may be a panel that receives a PDCCH (for example, a panel corresponding to CORESET #0 or all panels for receiving a PDCCH); may also be a corresponding panel that receives a PDSCH; may be the most recently scheduled panel; or may be a panel corresponding to the best beam.

Figure 3:
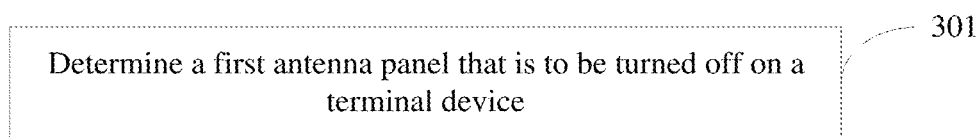
FIG. 3 is a second flowchart of an antenna panel control method according to an embodiment of the present disclosure.

Referring to FIG. 3, FIG. 3 is a flowchart of another antenna panel control method according to an embodiment of the present disclosure. The method is applied to a network side device. As shown in FIG. 3, the method includes the following steps:

Step 301: Determine a first antenna panel that is to be turned off on a terminal device.

Optionally, after the determining a first antenna panel that is to be turned off on the terminal device, the method further includes:

sending a first notification message to the terminal device, where the first notification message is used to indicate the first antenna panel.

Optionally, the first notification message includes first indication information, and the first indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the first notification message includes at least one of downlink measurement information, a sounding reference signal SRS initially configured by the network side device for the terminal device, an SRS configured and activated by the network side device for the terminal device, or target information;

where the target information is initial configuration information or activation configuration information used by the terminal device to receive data, or the target information is initial configuration information or activation configuration information used by the terminal device to receive control information.

Optionally, when the first notification message includes downlink measurement information and a first target parameter, the first notification message indicates the first antenna panel in any one of the following manners:

the first antenna panel is indicated by panel information that is not included in the downlink measurement information;

the first antenna panel is indicated by panel information that is not included in the first target parameter, where the first target parameter is a sounding reference signal SRS initially configured for the terminal device or an SRS configured and activated by the network side device for the terminal device; and the first antenna panel is indicated by an intersection set or a union set of panel information that is not included in the downlink measurement information and panel information that is not included in the first target parameter.

Optionally, the panel information that is not included in the first target parameter is: panel information that is not included in a first target object of the first target parameter, and the first target object is an SRS of all SRSs other than an SRS for beam management.

Optionally, the downlink measurement information includes a second target parameter, the second target parameter is a synchronization signal block SSB or a channel state information reference signal CSI-RS, the panel information that is not included in the downlink measurement information is: panel information included in a first target object of the second target parameter, and the first target object is an SSB of SSBs other than an SSB for beam management, or a CSI-RS of CSI-RSs other than a CSI-RS for beam management.

Optionally, when the first notification message includes the target information, the first notification message indicates the first antenna panel in the following manner:

determining the first antenna panel according to a third target parameter in the target information, where the third target parameter is panel information of a second antenna panel or the third target parameter is associated with a second antenna panel, and the second antenna panel is an antenna panel of all antenna panels of the terminal device other than the first antenna panel.

Optionally, before the determining a first antenna panel that is to be turned off on the terminal device, the method further includes:

receiving a second notification message sent by the terminal device, where the second notification message is used to indicate the first antenna panel.

Optionally, the second notification message includes second indication information, and the second indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the second notification message includes at least one of a beam report or an SRS that is sent to the network side device.

Optionally, when the second notification message includes the beam report, the terminal device indicates the first antenna panel to the network side device through the beam report.

Optionally, the first antenna panel is indicated through the beam report in any one of the following manners:

a second target antenna panel corresponding to panel information that is not included in the beam report is the first antenna panel;

a second target antenna panel implicitly indicated by the beam report is the first antenna panel;

a second target antenna panel corresponding to panel information that is not included in all beam reports sent in at least M times among beam reports sent in recent N times is the first antenna panel; and a second target antenna panel that is implicitly indicated by all beam reports sent in at least M times among beam reports sent in recent N times is the first antenna panel;

where N is an integer greater than 1, and M is a positive integer less than or equal to N.

Optionally, each beam report includes a measurement result of at least one antenna panel;

where that the beam report does not include the panel information of the second target antenna panel is: the beam report does not include a measurement result of the second target antenna panel; and that the beam report implicitly indicates the second target antenna panel is: the beam report indicates that the measurement result of the second target antenna panel is lower than a preset threshold.

Optionally, when the second notification message includes an SRS, the terminal device indicates the first antenna panel to the network side device through the SRS.

Optionally, the first antenna panel is indicated through the SRS in any one of the following manners:

an antenna panel corresponding to panel information that is not included in the SRS is the first antenna panel;

an antenna panel corresponding to panel information that is not implicitly indicated in the SRS is the first antenna panel;

an antenna panel corresponding to panel information that is not included in all SRSs sent in at least M times among SRSs sent in recent N times is the first antenna panel; and an antenna panel corresponding to panel information that is not implicitly indicated in all SRSs sent in at least M times among SRSs sent in recent N times is the first antenna panel; and where N is an integer greater than 1, and M is a positive integer less than or equal to N.

Optionally, the panel information that is included in the SRS is: panel information that is included in a first target object of the SRS, and the first target object is an SRS for beam management or an SRS of all SRSs other than an SRS for beam management.

Optionally, an antenna panel corresponding to panel information that is implicitly indicated in an SRS that is sent at the L-th time is: an antenna panel corresponding to an SRS that is not sent at the L-th time, where L is a positive integer less than or equal to N.

Optionally, the determining a first antenna panel that is to be turned off on the terminal device includes:

determining the first antenna panel that has not performed uplink and/or downlink transmission for a preset duration.

Optionally, not performing uplink transmission includes: neither data information nor control information is sent on the first antenna panel.

Optionally, not performing uplink transmission includes or does not include: sending a target sounding reference signal SRS on the first antenna panel, where the target SRS is an SRS for beam management.

Optionally, before the determining the first antenna panel that has not performed uplink and/or downlink transmission for a preset duration, the method further includes:

sending target information to the terminal device;

where the target information is initial configuration information or activation configuration information used by the terminal device to receive data, or the target information is initial configuration information or activation configuration information used by the terminal device to receive control information.

Optionally, a third target parameter of the target information includes or implicitly indicates panel information of the second antenna panel, and the second antenna panel is an antenna panel of antenna panels of the terminal device other than the first antenna panel.

Optionally, the target information includes a transmission configuration indicator state TCI state, and the third target parameter is a parameter in the TCI state.

Optionally, the third target parameter is a target reference signal, and the second antenna panel is an antenna panel corresponding to the target reference signal in the beam report.

Optionally, when the target reference signal corresponds to at least two first target antenna panels, the second antenna panel is an antenna panel having a better reporting result among the at least two first target antenna panels.

Optionally, not performing downlink transmission includes or does not include: receiving a second target object on the first antenna panel, where the second target object is an SSB or a CSI-RS for beam management.

It should be noted that the embodiment is an implementation of the network side device corresponding to the embodiment shown in FIG. 2. For the specific implementation, refer to the relevant description of the embodiment shown in FIG. 2. The same technical effects can be achieved. To avoid repetition, details are not described herein again.

Figure 4:
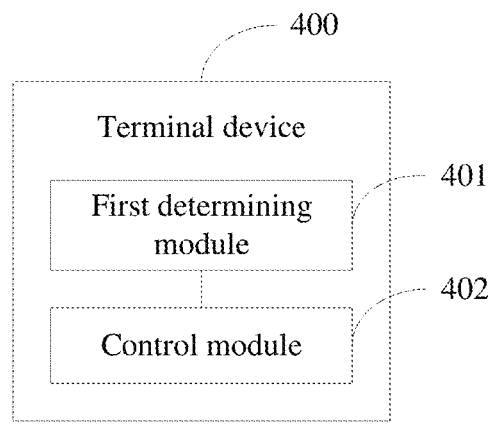
FIG. 4 is a first structural diagram of a terminal device according to an embodiment of the present disclosure.

Referring to FIG. 4, FIG. 4 is a structural diagram of a terminal device according to an embodiment of this disclosure. The terminal device includes at least two antenna panels. As shown in FIG. 4, the terminal device 400 includes:

a first determining module 401, configured to determine a first antenna panel that is to be turned off; and a control module 402, configured to control the first antenna panel to be in an off state.

Optionally, the first determining module 401 includes:

a receiving unit, configured to receive a first notification message sent by a network side device; and a determining unit, configured to determine the first antenna panel according to the first notification message.

Optionally, the first notification message includes first indication information, and the first indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the first notification message includes at least one of downlink measurement information, a sounding reference signal SRS initially configured by the network side device for the terminal device, an SRS configured and activated by the network side device for the terminal device, or target information;

where the target information is initial configuration information or activation configuration information used by the terminal device to receive data, or the target information is initial configuration information or activation configuration information used by the terminal device to receive control information.

Optionally, when the first notification message includes downlink measurement information and a first target parameter, the first determining module is configured to perform any one of the following operations:

determining that an antenna panel corresponding to panel information that is not included in the downlink measurement information is the first antenna panel;

determining that an antenna panel corresponding to panel information that is not included in the first target parameter is the first antenna panel, where the first target parameter is a sounding reference signal SRS initially configured for the terminal device or an SRS configured and activated by the network side device for the terminal device; and determining that an intersection set or a union set of an antenna panel corresponding to panel information that is not included in the downlink measurement information and an antenna panel corresponding to panel information that is not included in the first target parameter is the first antenna panel.

Optionally, the antenna panel corresponding to the panel information that is not included in the first target parameter is: an antenna panel corresponding to panel information that is not included in a first target object of the first target parameter, and the first target object is an SRS of all SRSs other than an SRS for beam management.

Optionally, the downlink measurement information includes a second target parameter, the second target parameter is a synchronization signal block SSB or a channel state information reference signal CSI-RS, the antenna panel corresponding to the panel information that is not included in the downlink measurement information is: an antenna panel corresponding to panel information included in a first target object of the second target parameter, and the first target object is an SSB of SSBs other than an SSB for beam management, or a CSI-RS of CSI-RSs other than a CSI-RS for beam management.

Optionally, when the first notification message includes the target information, the first determining module 401 is configured to:

determine the first antenna panel according to a third target parameter in the target information, where the third target parameter is panel information of a second antenna panel or the third target parameter is associated with a second antenna panel, and the second antenna panel is an antenna panel of all antenna panels of the terminal device other than the first antenna panel.

Optionally, the terminal device 400 further includes:

a first transmission module, configured to send a second notification message to the network side device, so that the network side device determines the first antenna panel according to the second notification message.

Optionally, the second notification message includes second indication information, and the second indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the second notification message includes at least one of a beam report or an SRS that is sent to the network side device.

Optionally, when the second notification message includes the beam report, the terminal device indicates the first antenna panel to the network side device through the beam report.

Optionally, the first antenna panel is indicated through the beam report in any one of the following manners:

a second target antenna panel corresponding to panel information that is not included in the beam report is the first antenna panel;

a second target antenna panel implicitly indicated by the beam report is the first antenna panel;

a second target antenna panel corresponding to panel information that is not included in all beam reports sent in at least M times among beam reports sent in recent N times is the first antenna panel; and a second target antenna panel that is implicitly indicated by all beam reports sent in at least M times among beam reports sent in recent N times is the first antenna panel;

where N is an integer greater than 1, and M is a positive integer less than or equal to N.

Optionally, each beam report includes a measurement result of at least one antenna panel;

where that the beam report does not include the panel information of the second target antenna panel is: the beam report does not include a measurement result of the second target antenna panel; and that the beam report implicitly indicates the second target antenna panel is: the beam report indicates that the measurement result of the second target antenna panel is lower than a preset threshold.

Optionally, when the second notification message includes an SRS, the terminal device indicates the first antenna panel to the network side device through the SRS.

Optionally, the first antenna panel is indicated through the SRS in any one of the following manners:

an antenna panel corresponding to panel information that is not included in the SRS is the first antenna panel;

an antenna panel corresponding to panel information that is not implicitly indicated in the SRS is the first antenna panel;

an antenna panel corresponding to panel information that is not included in all SRSs sent in at least M times among SRSs sent in recent N times is the first antenna panel; and an antenna panel corresponding to panel information that is not implicitly indicated in all SRSs sent in at least M times among SRSs sent in recent N times is the first antenna panel;

where N is an integer greater than 1, and M is a positive integer less than or equal to N.

Optionally, the panel information that is included in the SRS is: panel information that is included in a first target object of the SRS, and the first target object is an SRS for beam management or an SRS of all SRSs other than an SRS for beam management.

Optionally, an antenna panel corresponding to panel information that is implicitly indicated in an SRS that is sent at the L-th time is: an antenna panel corresponding to an SRS that is not sent at the L-th time, where L is a positive integer less than or equal to N.

Optionally, the first determining module 401 is configured to: determine the first antenna panel that has not performed uplink and/or downlink transmission for a preset duration.

Optionally, not performing uplink transmission includes: neither data information nor control information is sent on the first antenna panel.

Optionally, not performing uplink transmission includes or does not include: sending a target sounding reference signal SRS on the first antenna panel, where the target SRS is an SRS for beam management.

Optionally, before the determining the first antenna panel that has not performed uplink and/or downlink transmission for a preset duration, the method further includes:

receiving target information sent by the network side device.

where the target information is initial configuration information or activation configuration information used by the terminal device to receive data, or the target information is initial configuration information or activation configuration information used by the terminal device to receive control information.

Optionally, a third target parameter of the target information includes or implicitly indicates panel information of the second antenna panel, and the second antenna panel is an antenna panel of antenna panels of the terminal device other than the first antenna panel.

Optionally, the target information includes a transmission configuration indicator state TCI state, and the third target parameter is a parameter in the TCI state.

Optionally, the third target parameter is a target reference signal, and the second antenna panel is an antenna panel corresponding to the target reference signal in the beam report.

Optionally, when the target reference signal corresponds to at least two first target antenna panels, the second antenna panel is an antenna panel having a better reporting result among the at least two first target antenna panels.

Optionally, not performing downlink transmission includes or does not include: receiving a second target object on the first antenna panel, where the second target object is an SSB or a CSI-RS for beam management.

Optionally, the control module 402 is configured to:

if the terminal device includes the second antenna panel other than the first antenna panel, control all antenna panels belonging to the first antenna panel to be in the off state; or if the terminal device does not include the second antenna panel other than the first antenna panel, control a fifth target antenna panel of the first antenna panel to be in the off state, and control a sixth target antenna panel of the second antenna panel to be in the on state.

Optionally, the sixth target antenna panel is any one of the following antenna panels:

an antenna panel that receives a physical uplink control channel PUCCH;

a corresponding antenna panel that receives a physical uplink shared channel PUSCH;

an antenna panel that receives a physical downlink control channel PDCCH;

a corresponding antenna panel that receives a physical downlink shared channel PDSCH;

a most recently scheduled antenna panel; and an antenna panel corresponding to the best beam.

Optionally, the control module 401 is configured to:

turn off a sending module and/or a receiving module of the first antenna panel.

Optionally, the turning off a sending module of the first antenna panel includes:

skipping transmitting uplink service data and/or control information on the first antenna panel;

allowing or not allowing transmission of a codebook based SRS and a non-codebook based SRS on the first antenna panel;

allowing or not allowing sending of an SRS for beam management on the first antenna panel;

where during transmission of a codebook based SRS, a non-codebook based SRS, or an SRS for beam management on the first antenna panel, a transmission delay of the network side device includes an additional delay, and the additional delay is used to indicate time for turning on the first antenna panel.

Optionally, an SRS that is allowed to be sent and that is used for beam management on the first antenna panel is aperiodic.

Optionally, the turning off a receiving module of the first antenna panel includes:

skipping transmitting downlink service data and/or control information on the first antenna panel;

allowing or not allowing reception of a reference signal corresponding to first downlink channel state information CSI on the first antenna panel, where the reference signal corresponding to the first downlink CSI is a reference signal not for beam management; and allowing or not allowing reception of a reference signal corresponding to second CSI on the first antenna panel, where the reference signal corresponding to the second CSI is a reference signal for beam management;

where during reception of the reference signal corresponding to the first downlink CSI or the reference signal corresponding to the second downlink CSI on the first antenna panel, a transmission delay of the network side device includes an additional delay, and the additional delay is used to indicate time for turning on the first antenna panel.

Optionally, a reference signal that is allowed to be received and that corresponds to the second CSI on the first antenna panel is aperiodic.

Optionally, repetition setting of the reference signal corresponding to the second CSI is the on state.

Optionally, the reference signal corresponding to the second CSI includes an SSB or a CSI-RS.

Optionally, the second antenna panel of the terminal device other than the first antenna panel is in the on state.

Optionally, that the second antenna panel is in the on state is: allowing transmission of service data, control information, and a reference signal on the second antenna panel.

The terminal device provided in this embodiment of the present disclosure can implement the processes that are implemented by the terminal device in the method embodiment of FIG. 2. To avoid repetition, details are not described herein again.

Figure 5:
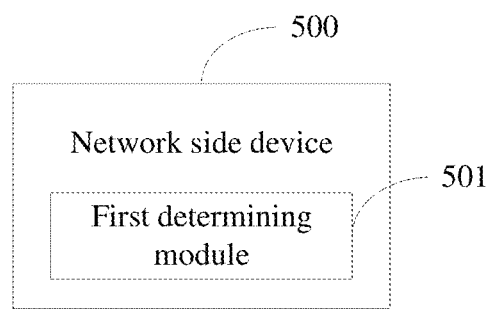
FIG. 5 is a first structural diagram of a network side device according to an embodiment of the present disclosure.

Referring to FIG. 5, FIG. 5 is a structural diagram of a network side device according to an embodiment of the present disclosure. As shown in FIG. 5, the network side device 500 includes:

a second determining module 501, configured to determine a first antenna panel that is to be turned off on a terminal device.

Optionally, the network side device 500 further includes:

a second transmission module, configured to send a first notification message to the terminal device, where the first notification message is used to indicate the first antenna panel.

Optionally, the first notification message includes first indication information, and the first indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the first notification message includes at least one of downlink measurement information, a sounding reference signal SRS initially configured by the network side device for the terminal device, an SRS configured and activated by the network side device for the terminal device, or target information;

where the target information is initial configuration information or activation configuration information used by the terminal device to receive data, or the target information is initial configuration information or activation configuration information used by the terminal device to receive control information.

Optionally, when the first notification message includes downlink measurement information and a first target parameter, the first notification message indicates the first antenna panel in any one of the following manners:

the first antenna panel is indicated by panel information that is not included in the downlink measurement information;

the first antenna panel is indicated by panel information that is not included in the first target parameter, where the first target parameter is a sounding reference signal SRS initially configured for the terminal device or an SRS configured and activated by the network side device for the terminal device; and the first antenna panel is indicated by an intersection set or a union set of panel information that is not included in the downlink measurement information and panel information that is not included in the first target parameter.

Optionally, the panel information that is not included in the first target parameter is: panel information that is not included in a first target object of the first target parameter, and the first target object is an SRS of all SRSs other than an SRS for beam management.

Optionally, the downlink measurement information includes a second target parameter, the second target parameter is a synchronization signal block SSB or a channel state information reference signal CSI-RS, the panel information that is not included in the downlink measurement information is: panel information included in a first target object of the second target parameter, and the first target object is an SSB of SSBs other than an SSB for beam management, or a CSI-RS of CSI-RSs other than a CSI-RS for beam management.

Optionally, when the first notification message includes the target information, the first notification message indicates the first antenna panel in the following manner:

determining the first antenna panel according to a third target parameter in the target information, where the third target parameter is panel information of a second antenna panel or the third target parameter is associated with a second antenna panel, and the second antenna panel is an antenna panel of all antenna panels of the terminal device other than the first antenna panel.

Optionally, the network side device 500 further includes:

a third transmission module, configured to receive a second notification message sent by the terminal device, where the second notification message is used to indicate the first antenna panel.

Optionally, the second notification message includes second indication information, and the second indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the second notification message includes at least one of a beam report or an SRS that is sent to the network side device.

Optionally, when the second notification message includes the beam report, the terminal device indicates the first antenna panel to the network side device through the beam report.

Optionally, the first antenna panel is indicated through the beam report in any one of the following manners:

a second target antenna panel corresponding to panel information that is not included in the beam report is the first antenna panel;

a second target antenna panel implicitly indicated by the beam report is the first antenna panel;

a second target antenna panel corresponding to panel information that is not included in all beam reports sent in at least M times among beam reports sent in recent N times is the first antenna panel; and a second target antenna panel that is implicitly indicated by all beam reports sent in at least M times among beam reports sent in recent N times is the first antenna panel;

where N is an integer greater than 1, and M is a positive integer less than or equal to N.

Optionally, each beam report includes a measurement result of at least one antenna panel;

where that the beam report does not include the panel information of the second target antenna panel is: the beam report does not include a measurement result of the second target antenna panel; and that the beam report implicitly indicates the second target antenna panel is: the beam report indicates that the measurement result of the second target antenna panel is lower than a preset threshold.

Optionally, when the second notification message includes an SRS, the terminal device indicates the first antenna panel to the network side device through the SRS.

Optionally, the first antenna panel is indicated through the SRS in any one of the following manners:

an antenna panel corresponding to panel information that is not included in the SRS is the first antenna panel;

an antenna panel corresponding to panel information that is not implicitly indicated in the SRS is the first antenna panel;

an antenna panel corresponding to panel information that is not included in all SRSs sent in at least M times among SRSs sent in recent N times is the first antenna panel; and an antenna panel corresponding to panel information that is not implicitly indicated in all SRSs sent in at least M times among SRSs sent in recent N times is the first antenna panel;

where N is an integer greater than 1, and M is a positive integer less than or equal to N.

Optionally, the panel information that is included in the SRS is: panel information that is included in a first target object of the SRS, and the first target object is an SRS for beam management or an SRS of all SRSs other than an SRS for beam management.

Optionally, an antenna panel corresponding to panel information that is implicitly indicated in an SRS that is sent at the L-th time is: an antenna panel corresponding to an SRS that is not sent at the L-th time, where L is a positive integer less than or equal to N.

Optionally, the second determining module is configured to: determine the first antenna panel that has not performed uplink and/or downlink transmission for a preset duration.

Optionally, not performing uplink transmission includes: neither data information nor control information is sent on the first antenna panel.

Optionally, not performing uplink transmission includes or does not include: sending a target sounding reference signal SRS on the first antenna panel, where the target SRS is an SRS for beam management.

Optionally, before the determining the first antenna panel that has not performed uplink and/or downlink transmission for a preset duration, the network side device further includes:

a fourth transmission module, configured to send target information to the terminal device;

where the target information is initial configuration information or activation configuration information used by the terminal device to receive data, or the target information is initial configuration information or activation configuration information used by the terminal device to receive control information.

Optionally, a third target parameter of the target information includes or implicitly indicates panel information of the second antenna panel, and the second antenna panel is an antenna panel of antenna panels of the terminal device other than the first antenna panel.

Optionally, the target information includes a transmission configuration indicator state TCI state, and the third target parameter is a parameter in the TCI state.

Optionally, the third target parameter is a target reference signal, and the second antenna panel is an antenna panel corresponding to the target reference signal in the beam report.

Optionally, when the target reference signal corresponds to at least two first target antenna panels, the second antenna panel is an antenna panel having a better reporting result among the at least two first target antenna panels.

Optionally, not performing downlink transmission includes or does not include: receiving a second target object on the first antenna panel, where the second target object is an SSB or a CSI-RS for beam management.

The network side device provided in embodiments of the present disclosure can implement the processes implemented by the network side device in the method embodiment of FIG. 3. To avoid repetition, details are not described herein again.

Figure 6:
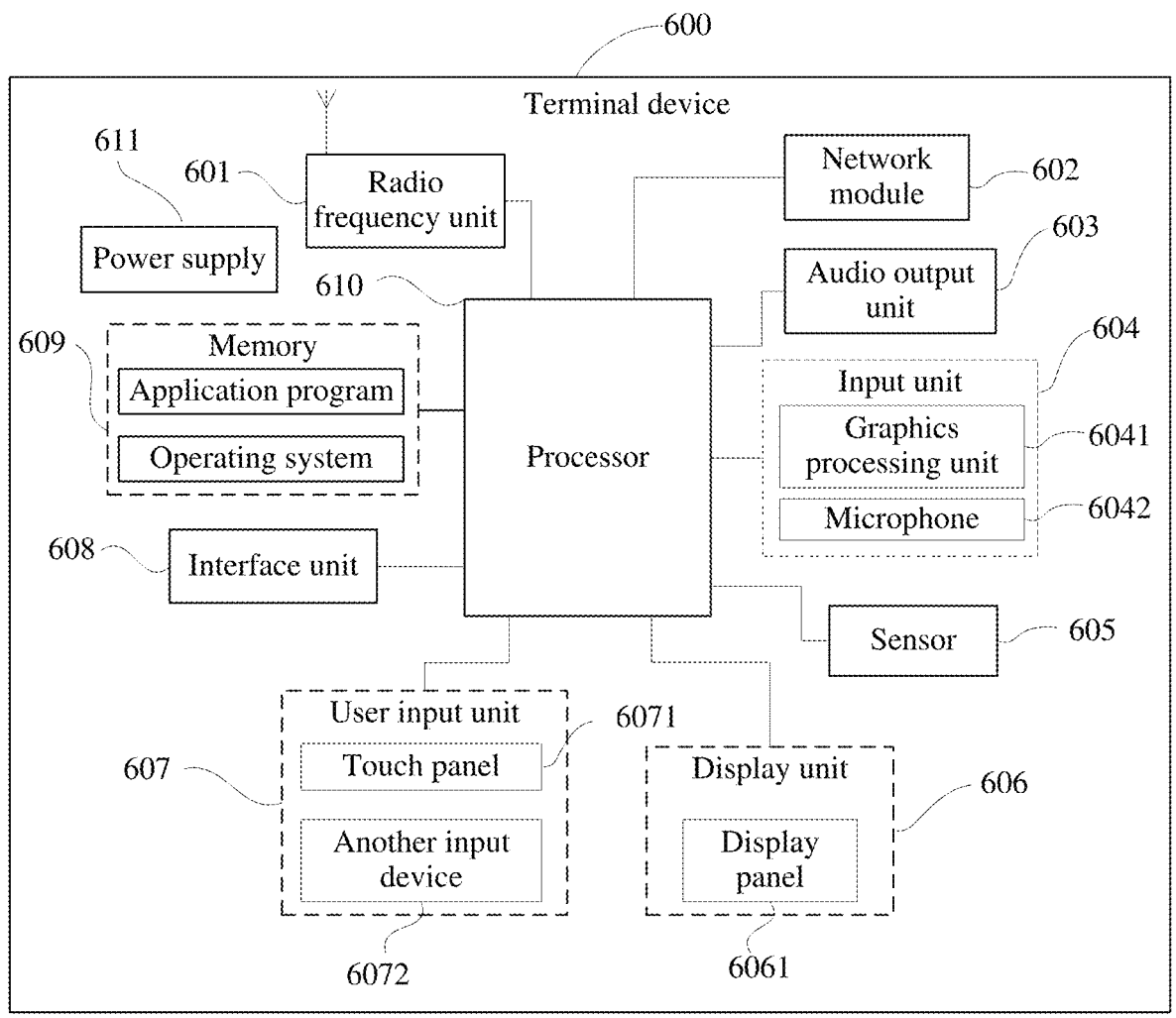
FIG. 6 is a second structural diagram of a terminal device according to an embodiment of the present disclosure.

FIG. 6 is a schematic diagram of a hardware structure of a mobile terminal according to an embodiment of this disclosure.

The mobile terminal 600 includes, but is not limited to: a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the mobile terminal shown in FIG. 6 constitutes no limitation on the mobile terminal, and the mobile terminal may include more or fewer parts than those shown in the figure, or combine some parts, or have a different part arrangement. In this embodiment of the present disclosure, the mobile terminal includes, but is not limited to, a mobile phone, a tablet computer, a laptop computer, a palmtop computer, an in-vehicle terminal, a wearable device, a pedometer, and the like.

The processor 610 is configured to determine a first antenna panel that is to be turned off; and control the first antenna panel to be in an off state.

Optionally, the processor 610 is configured to receive a first notification message sent by a network side device; and determine the first antenna panel according to the first notification message.

Optionally, the first notification message includes first indication information, and the first indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the first notification message includes at least one of downlink measurement information, a sounding reference signal SRS initially configured by the network side device for the terminal device, an SRS configured and activated by the network side device for the terminal device, or target information;

where the target information is initial configuration information or activation configuration information used by the terminal device to receive data, or the target information is initial configuration information or activation configuration information used by the terminal device to receive control information.

Optionally, when the first notification message includes downlink measurement information and a first target parameter, the determining, by the processor 610, a first antenna panel that is to be turned off includes any one of the following:

determining that an antenna panel corresponding to panel information that is not included in the downlink measurement information is the first antenna panel;

determining that an antenna panel corresponding to panel information that is not included in the first target parameter is the first antenna panel, where the first target parameter is a sounding reference signal SRS initially configured for the terminal device or an SRS configured and activated by the network side device for the terminal device; and determining that an intersection set or a union set of an antenna panel corresponding to panel information that is not included in the downlink measurement information and an antenna panel corresponding to panel information that is not included in the first target parameter is the first antenna panel.

Optionally, the antenna panel corresponding to the panel information that is not included in the first target parameter is: an antenna panel corresponding to panel information that is not included in a first target object of the first target parameter, and the first target object is an SRS of all SRSs other than an SRS for beam management.

Optionally, the downlink measurement information includes a second target parameter, the second target parameter is a synchronization signal block SSB or a channel state information reference signal CSI-RS, the antenna panel corresponding to the panel information that is not included in the downlink measurement information is: an antenna panel corresponding to panel information included in a first target object of the second target parameter, and the first target object is an SSB of SSBs other than an SSB for beam management, or a CSI-RS of CSI-RSs other than a CSI-RS for beam management.

Optionally, when the first notification message includes the target information, the determining, by the processor 610, a first antenna panel that is to be turned off includes:

determining the first antenna panel according to a third target parameter in the target information, where the third target parameter is panel information of a second antenna panel or the third target parameter is associated with a second antenna panel, and the second antenna panel is an antenna panel of all antenna panels of the terminal device other than the first antenna panel.

Optionally, the radio frequency unit 601 is configured to: send a second notification message to the network side device, so that the network side device determines the first antenna panel according to the second notification message.

Optionally, the second notification message includes second indication information, and the second indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the second notification message includes at least one of a beam report or an SRS that is sent to the network side device.

Optionally, when the second notification message includes the beam report, the terminal device indicates the first antenna panel to the network side device through the beam report.

Optionally, the first antenna panel is indicated through the beam report in any one of the following manners:

a second target antenna panel corresponding to panel information that is not included in the beam report is the first antenna panel;

a second target antenna panel implicitly indicated by the beam report is the first antenna panel;

a second target antenna panel corresponding to panel information that is not included in all beam reports sent in at least M times among beam reports sent in recent N times is the first antenna panel; and a second target antenna panel that is implicitly indicated by all beam reports sent in at least M times among beam reports sent in recent N times is the first antenna panel;

where N is an integer greater than 1, and M is a positive integer less than or equal to N.

Optionally, each beam report includes a measurement result of at least one antenna panel;

where that the beam report does not include the panel information of the second target antenna panel is: the beam report does not include a measurement result of the second target antenna panel; and that the beam report implicitly indicates the second target antenna panel is: the beam report indicates that the measurement result of the second target antenna panel is lower than a preset threshold.

Optionally, when the second notification message includes an SRS, the terminal device indicates the first antenna panel to the network side device through the SRS.

Optionally, the first antenna panel is indicated through the SRS in any one of the following manners:

an antenna panel corresponding to panel information that is not included in the SRS is the first antenna panel;

an antenna panel corresponding to panel information that is not implicitly indicated in the SRS is the first antenna panel;

an antenna panel corresponding to panel information that is not included in all SRSs sent in at least M times among SRSs sent in recent N times is the first antenna panel; and an antenna panel corresponding to panel information that is not implicitly indicated in all SRSs sent in at least M times among SRSs sent in recent N times is the first antenna panel;

where N is an integer greater than 1, and M is a positive integer less than or equal to N.

Optionally, the panel information that is included in the SRS is: panel information that is included in a first target object of the SRS, and the first target object is an SRS for beam management or an SRS of all SRSs other than an SRS for beam management.

Optionally, an antenna panel corresponding to panel information that is implicitly indicated in an SRS that is sent at the L-th time is: an antenna panel corresponding to an SRS that is not sent at the L-th time, where L is a positive integer less than or equal to N.

Optionally, the processor 610 is configured to: determine the first antenna panel that has not performed uplink and/or downlink transmission for a preset duration.

Optionally, not performing uplink transmission includes: neither data information nor control information is sent on the first antenna panel.

Optionally, not performing uplink transmission includes or does not include: sending a target sounding reference signal SRS on the first antenna panel, where the target SRS is an SRS for beam management.

Optionally, the radio frequency unit 601 is further configured to: receive target information sent by the network side device;

where the target information is initial configuration information or activation configuration information used by the terminal device to receive data, or the target information is initial configuration information or activation configuration information used by the terminal device to receive control information.

Optionally, a third target parameter of the target information includes or implicitly indicates panel information of the second antenna panel, and the second antenna panel is an antenna panel of antenna panels of the terminal device other than the first antenna panel.

Optionally, the target information includes a transmission configuration indicator state TCI state, and the third target parameter is a parameter in the TCI state.

Optionally, the third target parameter is a target reference signal, and the second antenna panel is an antenna panel corresponding to the target reference signal in the beam report.

Optionally, when the target reference signal corresponds to at least two first target antenna panels, the second antenna panel is an antenna panel having a better reporting result among the at least two first target antenna panels.

Optionally, not performing downlink transmission includes or does not include: receiving a second target object on the first antenna panel, where the second target object is an SSB or a CSI-RS for beam management.

Optionally, the processor 610 is configured to:

if the terminal device includes the second antenna panel other than the first antenna panel, control all antenna panels belonging to the first antenna panel to be in the off state; or if the terminal device does not include the second antenna panel other than the first antenna panel, control a fifth target antenna panel of the first antenna panel to be in the off state, and control a sixth target antenna panel of the second antenna panel to be in the on state.

Optionally, the sixth target antenna panel is any one of the following antenna panels:

an antenna panel that receives a physical uplink control channel PUCCH;

a corresponding antenna panel that receives a physical uplink shared channel PUSCH;

an antenna panel that receives a physical downlink control channel PDCCH;

a corresponding antenna panel that receives a physical downlink shared channel PDSCH;

a most recently scheduled antenna panel; and an antenna panel corresponding to the best beam.

Optionally, the controlling the first antenna panel to be in an off state includes any one of the following:

turning off a sending module and/or a receiving module of the first antenna panel.

Optionally, the turning off, by the processor 610, a sending module of the first antenna panel includes:

skipping transmitting uplink service data and/or control information on the first antenna panel;

allowing or not allowing transmission of a codebook based SRS and a non-codebook based SRS on the first antenna panel;

allowing or not allowing sending of an SRS for beam management on the first antenna panel;

where during transmission of a codebook based SRS, a non-codebook based SRS, or an SRS for beam management on the first antenna panel, a transmission delay of the network side device includes an additional delay, and the additional delay is used to indicate time for turning on the first antenna panel.

Optionally, an SRS that is allowed to be sent and that is used for beam management on the first antenna panel is aperiodic.

Optionally, the turning off, by the processor 610, a receiving module of the first antenna panel includes:

skipping transmitting downlink service data and/or control information on the first antenna panel;

allowing or not allowing reception of a reference signal corresponding to first downlink channel state information CSI on the first antenna panel, where the reference signal corresponding to the first downlink CSI is a reference signal not for beam management; and allowing or not allowing reception of a reference signal corresponding to second CSI on the first antenna panel, where the reference signal corresponding to the second CSI is a reference signal for beam management;

where during reception of the reference signal corresponding to the first downlink CSI or the reference signal corresponding to the second downlink CSI on the first antenna panel, a transmission delay of the network side device includes an additional delay, and the additional delay is used to indicate time for turning on the first antenna panel.

Optionally, a reference signal that is allowed to be received and that corresponds to the second CSI on the first antenna panel is aperiodic.

Optionally, repetition setting of the reference signal corresponding to the second CSI is the on state.

Optionally, the reference signal corresponding to the second CSI includes an SSB or a CSI-RS.

Optionally, the second antenna panel of the terminal device other than the first antenna panel is in the on state.

Optionally, that the second antenna panel is in the on state is: allowing transmission of service data, control information, and a reference signal on the second antenna panel.

In the embodiments of the present disclosure, after the first antenna panel that is to be turned off is determined, the first antenna panel is turned off. In this way, some or all of antenna panels of the terminal device may be turned off, thereby reducing power consumption of the terminal device and increasing standby time of the terminal device.

It should be understood that, in this embodiment of the present disclosure, the radio frequency unit 601 may be configured to receive and transmit information, or receive and transmit signals during a call. For example, the radio frequency unit 601 receives downlink data from a base station, and transmits the downlink data to the processor 610 for processing; and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The mobile terminal provides wireless broadband Internet access for a user by using the network module 602, for example, helping the user send and receive an email, browse a web page, and access streaming media.

The audio output unit 603 can convert audio data received by the radio frequency unit 601 or the network module 602 or stored in the memory 609 into an audio signal, and output the audio signal into sound. Moreover, the audio output unit 603 may further provide audio output (for example, call signal receiving sound and message receiving sound) related to a specific function executed by the mobile terminal 600. The audio output unit 603 includes a speaker, a buzzer, a telephone receiver, and the like.

The input unit 604 is configured to receive audio or radio frequency signals. The input unit 604 may include a graphics processing unit (GPU) 6041 and a microphone 6042. The graphics processing unit 6041 processes image data of a static image or a video obtained by an image capturing apparatus (such as, a camera) in a video capturing mode or an image capturing mode. A processed image frame can be displayed on the display unit 606. The image frame processed by the graphics processing unit 6041 can be stored in the memory 609 (or another storage medium) or sent via the radio frequency unit 601 or the network module 602. The microphone 6042 may receive sound and can process such sound into audio data. The processed audio data may be converted, in a call mode, into a format that can be sent by the radio frequency unit 601 to a mobile communication base station for output.

The mobile terminal 600 further includes at least one sensor 605, such as a light sensor, a motion sensor, and another sensor. For example, the light sensor includes an ambient light sensor and a proximity sensor. The ambient light sensor may adjust luminance of the display panel 6061 based on brightness of ambient light, and the proximity sensor may disable the display panel 6061 and/or backlight when the mobile terminal 600 approaches an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for the user. The display unit 606 may include a display panel 6061, and the display panel 6061 may be configured in a form of liquid crystal display (LCD), organic light-emitting diode (OLED), or the like.

The user input unit 607 may be configured to receive input digit or character information and generate key signal input related to user setting and function control of the mobile terminal. For example, the user input unit 607 includes a touch panel 6071 and other input devices 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and receives and executes a command sent by the processor 610. In addition, the touch panel 6071 can be implemented in various types such as resistive, capacitive, infrared, and surface acoustic waves. In addition to the touch panel 6071, the user input unit 607 may further include the other input devices 6072. For example, the another input device 6072 may include, but not limited to, a physical keyboard, a function key (for example, a volume control key or a switch key), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. In FIG. 6, aL-though the touch panel 6071 and the display panel 6061 are used as two independent parts to implement input and output functions of the mobile terminal, in some embodiments, the touch panel 6071 and the display panel 6061 may be integrated to implement the input and output functions of the mobile terminal. Details are not described herein.

The interface unit 608 is an interface connecting an external apparatus to the mobile terminal 600. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 608 may be configured to receive input (such as data information and power) from the external apparatus and transmit the received input to one or more elements in the mobile terminal 600, or may be configured to transmit data between the mobile terminal 600 and the external apparatus.

The memory 609 may be configured to store a software program and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random access memory or a nonvolatile memory, for example, at least one disk storage device, a flash memory, or another volatile solid-state storage device.

The processor 610 is a control center of the mobile terminal, and is connected to all parts of the entire mobile terminal by using various interfaces and lines, and performs various functions of the mobile terminal and processes data by running or executing the software program and/or the module that are/is stored in the memory 609 and invoking the data stored in the memory 609, to implement overall monitoring on the mobile terminal. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the foregoing modem processor may not be integrated into the processor 610.

The mobile terminal 600 may further include a power supply 611 (such as a battery) that supplies power to each component. Optionally, the power supply 611 may be logically connected to the processor 610 by using a power supply management system, to implement functions such as charging, discharging, and power consumption management by using the power supply management system.

In addition, the mobile terminal 600 includes some functional modules not shown, and details are not described herein again.

Optionally, an embodiment of the present disclosure further provides a terminal, including a processor 610, a memory 609, and a computer program that is stored in the memory 609 and that can run on the processor 610. When the computer program is executed by the processor 610, each process of embodiments of the foregoing antenna panel control method can be implemented, and a same technical effect can be achieved. To avoid repetition, details are not described herein again.

Figure 7:
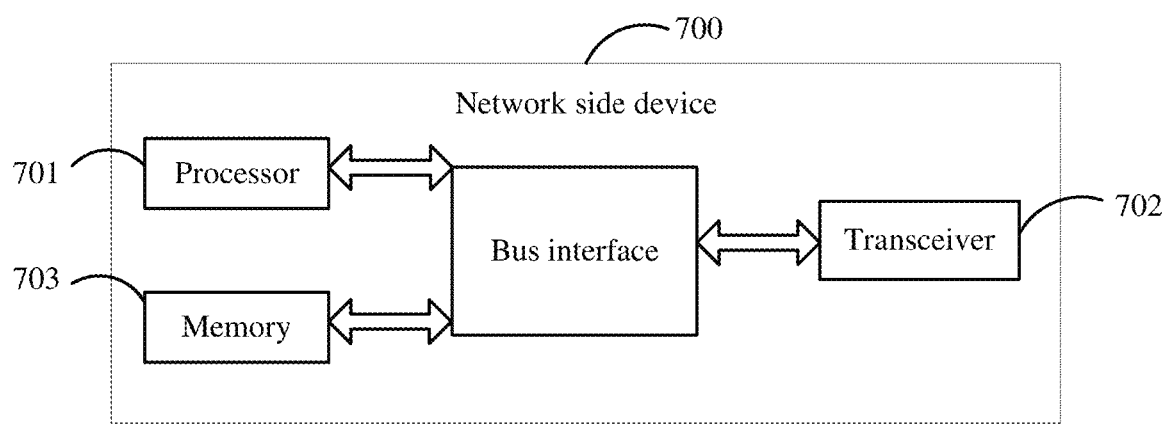
FIG. 7 is a second structural diagram of a network side device according to an embodiment of the present disclosure.

Referring to FIG. 7, FIG. 7 is a structural diagram of another network side device according to an embodiment of the present disclosure. As shown in FIG. 7, the network side device 700 includes a processor 701, a transceiver 702, a memory 703, and a bus interface.

The transceiver 702 is configured to send a first notification message to the terminal device, where the first notification message is used to indicate the first antenna panel.

Optionally, the first notification message includes first indication information, and the first indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the first notification message includes at least one of downlink measurement information, a sounding reference signal SRS initially configured by the network side device for the terminal device, an SRS configured and activated by the network side device for the terminal device, or target information;

where the target information is initial configuration information or activation configuration information used by the terminal device to receive data, or the target information is initial configuration information or activation configuration information used by the terminal device to receive control information.

Optionally, when the first notification message includes downlink measurement information and a first target parameter, the first notification message indicates the first antenna panel in any one of the following manners:

the first antenna panel is indicated by panel information that is not included in the downlink measurement information;

the first antenna panel is indicated by panel information that is not included in the first target parameter, where the first target parameter is a sounding reference signal SRS initially configured for the terminal device or an SRS configured and activated by the network side device for the terminal device; and the first antenna panel is indicated by an intersection set or a union set of panel information that is not included in the downlink measurement information and panel information that is not included in the first target parameter.

Optionally, the panel information that is not included in the first target parameter is: panel information that is not included in a first target object of the first target parameter, and the first target object is an SRS of all SRSs other than an SRS for beam management.

Optionally, the downlink measurement information includes a second target parameter, the second target parameter is a synchronization signal block SSB or a channel state information reference signal CSI-RS, the panel information that is not included in the downlink measurement information is: panel information included in a first target object of the second target parameter, and the first target object is an SSB of SSBs other than an SSB for beam management, or a CSI-RS of CSI-RSs other than a CSI-RS for beam management.

Optionally, when the first notification message includes the target information, the first notification message indicates the first antenna panel in the following manner:

determining the first antenna panel according to a third target parameter in the target information, where the third target parameter is panel information of a second antenna panel or the third target parameter is associated with a second antenna panel, and the second antenna panel is an antenna panel of all antenna panels of the terminal device other than the first antenna panel.

Optionally, before the determining a first antenna panel that is to be turned off on the terminal device, the method further includes:

receiving a second notification message sent by the terminal device, where the second notification message is used to indicate the first antenna panel.

Optionally, the second notification message includes second indication information, and the second indication information is used for instruction in any one of the following manners:

instructing a second antenna panel to be in an on state, where the second antenna panel is an antenna panel of all antenna panels of the terminal device other than the first antenna panel;

instructing the first antenna panel to be in the off state;

instructing the first antenna panel to be in the off state, and instructing the second antenna panel to be in the on state;

instructing a third antenna panel to switch from the on state to the off state, where the third antenna panel is at least one antenna panel of antenna panels that are currently in the on state; and instructing a fourth antenna panel to switch from the off state to the on state, where the fourth antenna panel is at least one antenna panel of antenna panels that are currently in the off state.

Optionally, the second notification message includes at least one of a beam report or an SRS that is sent to the network side device.

Optionally, when the second notification message includes the beam report, the terminal device indicates the first antenna panel to the network side device through the beam report.

Optionally, the first antenna panel is indicated through the beam report in any one of the following manners:

a second target antenna panel corresponding to panel information that is not included in the beam report is the first antenna panel;

a second target antenna panel implicitly indicated by the beam report is the first antenna panel;

a second target antenna panel corresponding to panel information that is not included in all beam reports sent in at least M times among beam reports sent in recent N times is the first antenna panel; and a second target antenna panel that is implicitly indicated by all beam reports sent in at least M times among beam reports sent in recent N times is the first antenna panel;

where N is an integer greater than 1, and M is a positive integer less than or equal to N.

Optionally, each beam report includes a measurement result of at least one antenna panel;

where that the beam report does not include the panel information of the second target antenna panel is: the beam report does not include a measurement result of the second target antenna panel; and that the beam report implicitly indicates the second target antenna panel is: the beam report indicates that the measurement result of the second target antenna panel is lower than a preset threshold.

Optionally, when the second notification message includes an SRS, the terminal device indicates the first antenna panel to the network side device through the SRS.

Optionally, the first antenna panel is indicated through the SRS in any one of the following manners:

an antenna panel corresponding to panel information that is not included in the SRS is the first antenna panel;

an antenna panel corresponding to panel information that is not implicitly indicated in the SRS is the first antenna panel;

an antenna panel corresponding to panel information that is not included in all SRSs sent in at least M times among SRSs sent in recent N times is the first antenna panel; and an antenna panel corresponding to panel information that is not implicitly indicated in all SRSs sent in at least M times among SRSs sent in recent N times is the first antenna panel; and where N is an integer greater than 1, and M is a positive integer less than or equal to N.

Optionally, the panel information that is included in the SRS is: panel information that is included in a first target object of the SRS, and the first target object is an SRS for beam management or an SRS of all SRSs other than an SRS for beam management.

Optionally, an antenna panel corresponding to panel information that is implicitly indicated in an SRS that is sent at the L-th time is: an antenna panel corresponding to an SRS that is not sent at the L-th time, where L is a positive integer less than or equal to N.

Optionally, the processor 701 is configured to:

determine the first antenna panel that has not performed uplink and/or downlink transmission for a preset duration.

Optionally, not performing uplink transmission includes: neither data information nor control information is sent on the first antenna panel.

Optionally, not performing uplink transmission includes or does not include: sending a target sounding reference signal SRS on the first antenna panel, where the target SRS is an SRS for beam management.

Optionally, the transceiver 702 is further configured to: send target information to the terminal device;

where the target information is initial configuration information or activation configuration information used by the terminal device to receive data, or the target information is initial configuration information or activation configuration information used by the terminal device to receive control information.

Optionally, a third target parameter of the target information includes or implicitly indicates panel information of the second antenna panel, and the second antenna panel is an antenna panel of antenna panels of the terminal device other than the first antenna panel.

Optionally, the target information includes a transmission configuration indicator state TCI state, and the third target parameter is a parameter in the TCI state.

Optionally, the third target parameter is a target reference signal, and the second antenna panel is an antenna panel corresponding to the target reference signal in the beam report.

Optionally, when the target reference signal corresponds to at least two first target antenna panels, the second antenna panel is an antenna panel having a better reporting result among the at least two first target antenna panels.

Optionally, not performing downlink transmission includes or does not include: receiving a second target object on the first antenna panel, where the second target object is an SSB or a CSI-RS for beam management.

In FIG. 7, the bus architecture may include any number of interconnected buses and bridges, which are connected together by various circuits of one or more processors represented by the processor 701 and a memory represented by the memory 703. The bus architecture may further link various other circuits such as a peripheral device, a voltage regulator, and a power management circuit together. These are all well-known in the art, and therefore are not further described in this specification. The bus interface provides an interface. The transceiver 702 may be a plurality of elements, in other words, includes a transmitter and a receiver, and provides a unit configured to communicate with various other apparatuses on a transmission medium. For different user equipment, the user interface 704 may alternatively be an interface for externally and internally connecting required equipment. The connected equipment includes but is not limited to a keypad, a display, a speaker, a microphone, a joystick, and the like.

The processor 701 is responsible for bus architecture management and general processing. The memory 703 may store data used by the processor 701 when the processor 701 performs an operation.

Optionally, an embodiment of the present disclosure further provides a network side device, including a processor 701, a memory 703, and a computer program that is stored in the memory 703 and that can run on the processor 701. When the computer program is executed by the processor 701, each process of embodiments of the foregoing antenna panel control method can be implemented, and a same technical effect can be achieved. To avoid repetition, details are not described herein again.

An embodiment of the present disclosure further provides a non-transitory computer readable storage medium, where the non-transitory computer readable storage medium stores a computer program, the computer program, when executed by the processor, implements the processes of the embodiments of the antenna panel control method for a terminal device side provided in the embodiment of the present disclosure, or the computer program, when executed by the processor, implements the processes of the embodiments of the antenna panel control method for a network side device side provided in the embodiment of the present disclosure, and the same technical effects can be achieved. To avoid repetition, details are not described herein again. The non-transitory computer readable storage medium is, for example, a read-only memory (ROM), a random access memory (RAM), a magnetic disk, or an optical disc.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed on a plurality of network units. Some or all of the units may be selected based on actual requirements to achieve the objectives of the solutions of the embodiments of the present disclosure.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

A person of ordinary skill in the art can understand that all or some of the procedures in the methods of the foregoing embodiments may be implemented by a computer program controlling related hardware. The program may be stored in a non-transitory computer-readable storage medium. When the program is executed, the procedures of the embodiments of the foregoing methods may be performed. The foregoing storage medium may be a magnetic disk, an optical disc, a read-only memory, a random access memory, or the like.

It may be understood that the embodiments described in the embodiments of the present disclosure may be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software codes can be stored in the memory and executed by the processor. The memory may be implemented inside or outside the processor.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An antenna panel control method, applied to a terminal device comprising at least two antenna panels, comprising:
   determining a first antenna panel that is to be turned off; and
   controlling the first antenna panel to be in an off state;
   wherein the determining a first antenna panel that is to be turned off comprises:
      receiving a first notification message sent by a network side device; and
      determining the first antenna panel according to the first notification message;
   wherein the first notification message comprises downlink measurement information;
   wherein the determining the first antenna panel that is to be turned off comprises:
      determining that an antenna panel corresponding to panel information that is not comprised in the downlink measurement information is the first antenna panel;
   wherein the downlink measurement information comprises a second target parameter, the second target parameter is a synchronization signal block (SSB) or a channel state information reference signal (CSI-RS), the antenna panel corresponding to the panel information that is not comprised in the downlink measurement information is:
      an antenna panel corresponding to panel information comprised in a first target object of the second target parameter, and the first target object is an SSB of SSBs other than an SSB for beam management, or a CSI-RS of CSI-RSs other than a CSI-RS for beam management.

2. The method according to claim 1, wherein the first notification message comprises first indication information, and the first indication information is used for instruction in any one of following manners:
   instructing a second antenna panel to be in an on state, wherein the second antenna panel is an antenna panel of all antenna panels of the terminal device other than the first antenna panel;
   instructing the first antenna panel to be in the off state;
   instructing the first antenna panel to be in the off state, and instructing the second antenna panel to be in the on state;
   instructing a third antenna panel to switch from the on state to the off state, wherein the third antenna panel is at least one antenna panel of antenna panels that are currently in the on state; and
   instructing a fourth antenna panel to switch from the off state to the on state, wherein the fourth antenna panel is at least one antenna panel of antenna panels that are currently in the off state;
   and/or,
   the first notification message further comprises at least one of a sounding reference signal (SRS) initially configured by the network side device for the terminal device, an SRS configured and activated by the network side device for the terminal device, or target information;
   wherein the target information is initial configuration information or activation configuration information used by the terminal device to receive data, or the target information is initial configuration information or activation configuration information used by the terminal device to receive control information.

3. The method according to claim 2, wherein when the first notification message comprises downlink measurement information and a first target parameter, the determining a first antenna panel that is to be turned off comprises any one of following:
   determining that an antenna panel corresponding to panel information that is not comprised in the first target parameter is the first antenna panel, wherein the first target parameter is an SRS initially configured for the terminal device or an SRS configured and activated by the network side device for the terminal device; and
   determining that an intersection set or a union set of an antenna panel corresponding to panel information that is not comprised in the downlink measurement information and an antenna panel corresponding to panel information that is not comprised in the first target parameter is the first antenna panel;
   and/or,
   when the first notification message comprises the target information, the determining a first antenna panel that is to be turned off comprises:

determining the first antenna panel according to a third target parameter in the target information, wherein the third target parameter is panel information of a second antenna panel or the third target parameter is associated with a second antenna panel, and the second antenna panel is an antenna panel of all antenna panels of the terminal device other than the first antenna panel.

4. The method according to claim 3, wherein the antenna panel corresponding to the panel information that is not comprised in the first target parameter is: an antenna panel corresponding to panel information that is not comprised in a first target object of the first target parameter, and the first target object is an SRS of all SRSs other than an SRS for beam management.

5. The method according to claim 1, after the determining a first antenna panel that is to be turned off, further comprising:
sending a second notification message to the network side device, so that the network side device determines the first antenna panel according to the second notification message.

6. The method according to claim 3, wherein a second notification message comprises second indication information, and the second indication information is used for instruction in any one of following manners:
instructing a second antenna panel to be in an on state, wherein the second antenna panel is an antenna panel of all antenna panels of the terminal device other than the first antenna panel;
instructing the first antenna panel to be in the off state;
instructing the first antenna panel to be in the off state, and instructing the second antenna panel to be in the on state;
instructing a third antenna panel to switch from the on state to the off state, wherein the third antenna panel is at least one antenna panel of antenna panels that are currently in the on state; and
instructing a fourth antenna panel to switch from the off state to the on state, wherein the fourth antenna panel is at least one antenna panel of antenna panels that are currently in the off state;
and/or,
the second notification message comprises at least one of a beam report or an SRS that is sent to the network side device.

7. The method according to claim 6, wherein when the second notification message comprises the beam report, the terminal device indicates the first antenna panel to the network side device through the beam report; and/or,
when the second notification message comprises an SRS, the terminal device indicates the first antenna panel to the network side device through the SRS.

8. The method according to claim 7, wherein the first antenna panel is indicated through the beam report in any one of following manners:
a second target antenna panel corresponding to panel information that is not comprised in the beam report is the first antenna panel;
a second target antenna panel implicitly indicated by the beam report is the first antenna panel;
a second target antenna panel corresponding to panel information that is not comprised in all beam reports sent in at least M times among beam reports sent in recent N times is the first antenna panel; and a second target antenna panel that is implicitly indicated by all beam reports sent in at least M times among beam reports sent in recent N times is the first antenna panel;
wherein N is an integer greater than 1, and M is a positive integer less than or equal to N;
and/or,
the first antenna panel is indicated through the SRS in at least one of following manners:
an antenna panel corresponding to panel information that is not comprised in the SRS is the first antenna panel;
an antenna panel corresponding to panel information that is not implicitly indicated in the SRS is the first antenna panel;
an antenna panel corresponding to panel information that is not comprised in all SRSs sent in at least M times among SRSs sent in recent N times is the first antenna panel; or
an antenna panel corresponding to panel information that is not implicitly indicated in all SRSs sent in at least M times among SRSs sent in recent N times is the first antenna panel;
wherein N is an integer greater than 1, and M is a positive integer less than or equal to N.

9. The method according to claim 8, wherein each beam report comprises a measurement result of at least one antenna panel;
wherein that the beam report does not comprise the panel information of the second target antenna panel is: the beam report does not comprise a measurement result of the second target antenna panel; and
that the beam report implicitly indicates the second target antenna panel is: the beam report indicates that the measurement result of the second target antenna panel is lower than a preset threshold.

10. The method according to claim 1, wherein the determining a first antenna panel that is to be turned off comprises:
determining the first antenna panel that has not performed uplink and/or downlink transmission for a preset duration.

11. The method according to claim 10, wherein before the determining the first antenna panel that has not performed uplink and/or downlink transmission for a preset duration, the method further comprises:
receiving target information sent by the network side device;
wherein the target information is initial configuration information or activation configuration information used by the terminal device to receive data, or the target information is initial configuration information or activation configuration information used by the terminal device to receive control information.

12. The method according to claim 10, wherein the controlling the first antenna panel to be in an off state comprises:
if the terminal device comprises a second antenna panel other than the first antenna panel, controlling all antenna panels belonging to the first antenna panel to be in the off state; or
if the terminal device does not comprise the second antenna panel other than the first antenna panel, controlling a fifth target antenna panel of the first antenna panel to be in the off state, and controlling a sixth target antenna panel to be in the on state.

13. The method according to claim 12, wherein the sixth target antenna panel is any one of following antenna panels:

an antenna panel that receives a physical uplink control channel (PUCCH);
a corresponding antenna panel that receives a physical uplink shared channel (PUSCH);
an antenna panel that receives a physical downlink control channel (PDCCH);
a corresponding antenna panel that receives a physical downlink shared channel (PDSCH);
a most recently scheduled antenna panel; and
an antenna panel corresponding to a best beam.

14. The method according to claim 1, wherein the controlling the first antenna panel to be in an off state comprises any one of following:
turning off a sending module and/or a receiving module of the first antenna panel.

15. The method according to claim 14, wherein the turning off a sending module of the first antenna panel comprises:
skipping transmitting uplink service data and/or control information on the first antenna panel;
allowing or not allowing transmission of a codebook based sounding reference signal (SRS) and a non-codebook based SRS on the first antenna panel; and
allowing or not allowing sending of an SRS for beam management on the first antenna panel;
wherein during transmission of a codebook based SRS, a non-codebook based SRS, or an SRS for beam management on the first antenna panel, a transmission delay of the network side device comprises an additional delay, and the additional delay is used to indicate time for turning on the first antenna panel;
and/or,
the turning off a receiving module of the first antenna panel comprises:
skipping transmitting downlink service data and/or control information on the first antenna panel;
allowing or not allowing reception of a reference signal corresponding to first downlink channel state information (CSI) on the first antenna panel, wherein the reference signal corresponding to the first downlink CSI is a reference signal not for beam management; and
allowing or not allowing reception of a reference signal corresponding to second CSI on the first antenna panel, wherein the reference signal corresponding to the second CSI is a reference signal for beam management;
wherein during reception of the reference signal corresponding to the first downlink CSI or the reference signal corresponding to the second downlink CSI on the first antenna panel, a transmission delay of the network side device comprises an additional delay, and the additional delay is used to indicate time for turning on the first antenna panel.

16. The method according to claim 1, wherein a second antenna panel of the terminal device other than the first antenna panel is in the on state.

17. The method according to claim 16, wherein that a second antenna panel is in the on state is: allowing transmission of service data, control information, and a reference signal on the second antenna panel.

18. A terminal device, comprising: a memory, a processor, and a program stored in the memory and executable on the processor, wherein the program, when executed by the processor, causes the terminal device to perform:
determining a first antenna panel that is to be turned off; and
controlling the first antenna panel to be in an off state;
wherein
the program, when executed by the processor, causes the terminal device to perform:
receiving a first notification message sent by a network side device; and
determining the first antenna panel according to the first notification message; wherein
the first notification message comprises downlink measurement information;
wherein the program, when executed by the processor, causes the terminal device to perform:
determining that an antenna panel corresponding to panel information that is not comprised in the downlink measurement information is the first antenna panel;
wherein the downlink measurement information comprises a second target parameter, the second target parameter is a synchronization signal block (SSB) or a channel state information reference signal (CSI-RS), the antenna panel corresponding to the panel information that is not comprised in the downlink measurement information is: an antenna panel corresponding to panel information comprised in a first target object of the second target parameter, and the first target object is an SSB of SSBs other than an SSB for beam management, or a CSI-RS of CSI-RSs other than a CSI-RS for beam management.

19. The terminal device according to claim 18, wherein the first notification message comprises first indication information, and the first indication information is used for instruction in any one of following manners:
instructing a second antenna panel to be in an on state, wherein the second antenna panel is an antenna panel of all antenna panels of the terminal device other than the first antenna panel;
instructing the first antenna panel to be in the off state;
instructing the first antenna panel to be in the off state, and instructing the second antenna panel to be in the on state;
instructing a third antenna panel to switch from the on state to the off state, wherein the third antenna panel is at least one antenna panel of antenna panels that are currently in the on state; and
instructing a fourth antenna panel to switch from the off state to the on state, wherein the fourth antenna panel is at least one antenna panel of antenna panels that are currently in the off state;
and/or,
the first notification message further comprises at least one of a sounding reference signal (SRS) initially configured by the network side device for the terminal device, an SRS configured and activated by the network side device for the terminal device, or target information;
wherein the target information is initial configuration information or activation configuration information used by the terminal device to receive data, or the target information is initial configuration information or activation configuration information used by the terminal device to receive control information.

20. A network side device, comprising: a memory, a processor, and a program stored in the memory and executable on the processor, wherein the program, when executed by the processor, causes the network side device to perform:

determining a first antenna panel that is to be turned off on a terminal device; wherein the program, when executed by the processor, causes the network side device to further perform:

sending a first notification message to the terminal device; wherein the first notification message is used to indicate the first antenna panel, and the first notification message comprises downlink measurement information;

wherein the program, when executed by the processor, causes the terminal device to perform:

determining that an antenna panel corresponding to panel information that is not comprised in the downlink measurement information is the first antenna panel;

wherein the downlink measurement information comprises a second target parameter, the second target parameter is a synchronization signal block (SSB) or a channel state information reference signal (CSI-RS), the antenna panel corresponding to the panel information that is not comprised in the downlink measurement information is: an antenna panel corresponding to panel information comprised in a first target object of the second target parameter, and the first target object is an SSB of SSBs other than an SSB for beam management, or a CSI-RS of CSI-RSs other than a CSI-RS for beam management.

* * * * *